(12) United States Patent  (10) Patent No.: US 8,029,050 B2
Tamakoshi  (45) Date of Patent: Oct. 4, 2011

(54) VEHICLE FRONT STRUCTURE

(75) Inventor: Koji Tamakoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 283 days.

(21) Appl. No.: 12/447,048

(22) PCT Filed: Oct. 24, 2007

(86) PCT No.: PCT/IB2007/003595
§ 371 (c)(1),
(2), (4) Date: Apr. 24, 2009

(87) PCT Pub. No.: WO2008/050237
PCT Pub. Date: May 2, 2008

(65) Prior Publication Data
US 2010/0026051 A1 Feb. 4, 2010

(30) Foreign Application Priority Data

Oct. 25, 2006 (JP) .................. 2006-290346

(51) Int. Cl.
*B62D 25/00* (2006.01)
(52) U.S. Cl. .......... 296/203.01; 296/203.02; 296/193.06
(58) Field of Classification Search ............. 296/193.06, 296/203.01, 203.02, 203.03
See application file for complete search history.

(56) References Cited

U.S. PATENT DOCUMENTS

| 5,246,264 | A | * | 9/1993 | Yoshii ..................... 296/203.03 |
| 5,586,799 | A | * | 12/1996 | Kanemitsu et al. ...... 296/203.02 |
| 5,941,597 | A | * | 8/1999 | Horiuchi et al. ......... 296/203.01 |
| 6,364,401 | B1 | | 4/2002 | Kim |
| 2004/0189055 | A1 | | 9/2004 | Tomita |

FOREIGN PATENT DOCUMENTS

| EP | 0 226 012 A | 6/1987 |
| EP | 0 878 379 A | 11/1998 |
| JP | 6-42542 U | 6/1994 |
| JP | 410244959 | * 9/1998 |
| JP | 2002-316666 A | 10/2002 |
| JP | 2004-276630 A | 10/2004 |
| JP | 2004-299633 A | 10/2004 |
| JP | 2005-170320 A | 6/2005 |

* cited by examiner

*Primary Examiner* — Dennis Pedder
(74) *Attorney, Agent, or Firm* — Kenyon & Kenyon LLP

(57) ABSTRACT

A vehicle front structure includes: a structural member that is disposed forward of a cabin of a vehicle and that extends in a width direction of a vehicle; a front pillar that extends in a height direction of the vehicle; a pillar brace having a cabin-side end portion in the vehicle width direction that is coupled to the structural member, and an outer-side end portion in the vehicle width direction that is coupled to a cabin-side surface of the front pillar; and reinforcement means for heightening at least a strength of the cabin-side surface and a front surface of the front pillar, the reinforcement means being provided at a height at which the front pillar and the pillar brace are connected to each other.

21 Claims, 15 Drawing Sheets

VEHICLE FRONT STRUCTURE

This is a 371 national phase application of PCT/IB2007/003595 filed 24 Oct. 2007, claiming priority to Japanese Patent Application No. 2006-290346 filed 25 Oct. 2006, the contents of which are incorporated herein by reference.

BACKGROUND OF THE INVENTION

1. Field of the Invention

The invention relates to a vehicle front structure.

2. Description of the Related Art

A front structure in various vehicles, such as passenger cars and the like, incorporates a structure for absorbing impact at the time of a collision with a body such as another vehicle or the like. In the front structure, a pair of right and left front side members extend in the longitudinal direction of the vehicle, and a dash panel extending in the vehicle width direction is disposed on rear end portions of the front side members, and a dash cross-member extending in the vehicle width direction is disposed along the dash panel. Furthermore, a front structure described in Japanese Patent Application Publication No. JP-A-2004-276630 also includes pillar braces (reinforcement members) linking the dash panel and the front pillars. The pillar braces are provided at positions that correspond to a height at which the dash cross-member (cross-member) is mounted.

In the foregoing front structure, each pillar brace is joined only to an inner side surface of a pillar inner member of a corresponding one of the front pillars. Each front pillar has a tubular shape whose wall thickness is consistent throughout the entire portion thereof. Therefore, in the case of a frontal collision of the vehicle, as the collision load input to the front side members is transmitted to the front pillars via the pillar braces, stress concentration occurs in junctions between the pillar brace and the front pillars, so that the front pillars (particularly, pillar inner members) deform. Thus, the efficiency of the transmission of the load to the entire skeleton of the front pillar declines. As a result, the absorption of the collision load by the front pillars cannot be fully performed. Besides, since the front pillars cannot sufficiently support two opposite end portions of the dash cross-member or the dash panel, the dash cross-member or the dash panel deforms into the space of the cabin. On the other hand, in the case of an angled forward collision, if a collision load is input to a front pillar directly or via a tire, the front pillar (in particular, a pillar outer member) deforms into the cabin, and therefore the collision load cannot be sufficiently absorbed by the front pillar. As a result, the efficiency of the load transmission from the front pillars to the pillar braces declines, and therefore the efficiency of the load transmission to the dash cross-member or the dash panel declines. Thus, in the foregoing front structure, a front pillar tends to deform so that the collision load cannot be effectively dispersed.

SUMMARY OF THE INVENTION

The invention provides a vehicle front structure that restrains the deformation of a front pillar at the time of a collision, and that improves the efficiency of the transmission of collision load.

One aspect of the invention relates to a vehicle front structure including: a structural member that is disposed forward of a cabin of a vehicle and that extends in a vehicle width direction; a front pillar that is provided at each of two opposite ends of the structural member in the vehicle width direction and that extends in a height direction of the vehicle; and a pillar brace which has a first end portion that is provided at a cabin side and that is coupled to the structural member, and which has a second end portion that is provided at an outer side of the first end portion in the vehicle width direction and that is coupled to a cabin-side surface of the front pillar. This vehicle front structure is characterized by including reinforcement means for heightening at least a strength of the cabin-side surface and a front surface of the front pillar in a vehicle longitudinal direction, the reinforcement means being provided at a height at which the front pillar and the pillar brace are connected to each other.

In this vehicle front structure, the structural member is disposed forward of the cabin, and front pillars are disposed at two opposite sides of the structural member. The pillar braces link the structural member to the cabin-side surfaces of the front pillars. Furthermore, the vehicle front structure further includes the reinforcement means for heightening the strength (bending strength, torsion strength, etc.) of at least the cabin-side surface and the front surface of each front pillar at the height at which the front pillars are linked. Due to this means, in the vehicle front structure, the strength of each front pillar itself is heightened, and the coupling strength between the front pillars and the pillar braces is heightened. Therefore, in the case where at the time of a frontal collision, the collision load transmitted to the structural member is transmitted to the front pillars via the pillar braces, the deformation of the front pillars is restrained by the reinforcement means so that the collision load is sufficiently transmitted to the entire skeletons of the front pillars even if stress concentration occurs in the coupling portions of the front pillars with the pillar braces. As a result, the front pillars can sufficiently absorb the collision load. Besides, the two opposite end portions of the structural member can be firmly supported, and the deformation of the structural member rearward with respect to the vehicle (i.e., into the cabin) can be restrained. On the other hand, in the case where at the time of an angled forward collision, collision load is input to a front pillar directly or via a tire, the deformation of the front pillar into the space of the cabin can be restrained by the reinforcement means so that the collision load can be sufficiently absorbed by the front pillar. As a result, the collision load can be transmitted to the pillar braces, so that the collision load can be sufficiently transmitted to the structural member. In this manner, the vehicle front structure is able to restrain the deformation of the front pillars at the time of a collision, and improves the efficiency of the transmission of collision load, and can effectively disperse the collision load. As a result, the cabin strength improves, and the safety at the time of a collision improves.

In the foregoing construction, the reinforcement means may heighten at least the strength between the cabin-side surface and the front surface of each front pillar at the height at which the front pillar and the pillar brace are coupled to each other.

According to the foregoing construction, the reinforcement means may raise at least the strength between the cabin-side surface and the front surface (i.e., the strength of a corner portion connecting the cabin-side surface and the front surface) of each front pillar at the height position at which the front pillars are linked. Due to this, in the vehicle front structure, the strength of the front pillars further heightens, and the restraining effect on the deformation of the front pillars in the case where a collision load is input to a front pillar can be improved.

In the foregoing construction, the reinforcement means may be a reinforcement member that is provided within the front pillar at such a position as to overlap with the height at which the front pillar and the pillar brace are coupled to each other, and that has a cabin-side surface portion facing a cabin-side surface of an interior of the front pillar, and a front surface portion facing a front-side surface of the interior of the front pillar.

According to the foregoing vehicle front structure, the simple construction in which the foregoing reinforcement member is disposed within each front pillar heightens the strength of each front pillar itself, and also heightens the coupling strength between the front pillars and the pillar braces.

In the foregoing construction, the reinforcement member may have a rear surface portion that faces the rear surface of the front pillar.

According to this construction, the reinforcement member having the rear surface portion further heightens the strength of each front pillar itself, and the coupling strength between the front pillars and the pillar braces.

In the foregoing construction, the reinforcement member may be coupled to the pillar brace, with the cabin-side surface of the front pillar sandwiched therebetween.

In this vehicle front structure, each reinforcement member and a corresponding one of the pillar braces are coupled via the cabin-side surface of a corresponding one of the front pillars. Therefore, according to this vehicle front structure, the coupling strength between the front pillars and the pillar braces heightens, and the efficiency of the transmission of collision load between the front pillars and the pillar braces further improves.

In the foregoing construction, the front pillar may be made up of a pillar outer member provided at an outer side in the vehicle width direction, and a pillar inner member provided at the cabin-side of the pillar outer member, and the second end portion of the pillar brace is coupled to the pillar inner member. Besides, in the foregoing vehicle front structure of the invention, the structural member may be a dash panel, and the cabin-side end portion of the pillar brace may be coupled to the dash panel. Besides, in the foregoing vehicle front structure of the invention, the structural member may be a dash cross-member, and the cabin-side end portion of the pillar brace may be coupled to the dash cross-member. In addition, a forward portion of the structural member may be coupled to both the dash panel and the dash cross-member.

In the foregoing construction, the pillar brace may be disposed at such a position as to overlap with the front side member in the height direction of the vehicle.

According to the foregoing construction, the pillar braces are disposed at the height position at which the front side members are disposed. This arrangement further improves the efficiency of the transmission of collision load between the front side members, the structural member, the pillar braces and the front pillars.

In the foregoing construction, the pillar brace may be disposed at such a position as to overlap with a front side member in the vehicle width direction.

According to the foregoing construction, the pillar braces are disposed at such positions as to overlap with the front side members in the vehicle width direction. This arrangement further improves the efficiency of the transmission of collision load between the front side members, the structural member, the pillar braces and the front pillars.

Thus, the invention can restrain the deformation of the front pillars at the time of a collision, and improves the efficiency of the transmission of collision load, and can effectively disperse the collision load.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Embodiments of the vehicle front structure of the invention will be described hereinafter with reference to the drawings.

In embodiments of the invention below, a vehicle front structure in accordance with the invention is applied to a front structure of a vehicle body of a normal-size passenger car. In front structures in accordance with the embodiments below, a reinforcement member is provided within each front pillar in order to heighten the strength (rigidity) of the front pillar. In the embodiments below, seven constructions that are different from each other in the shape of the reinforcement member are provided. In the description of the shape, size, etc., of various members of the front structure in each of the embodiments below, the members are disposed in a vehicle, and the shapes, sizes, etc., thereof are expressed by using the vehicle longitudinal direction, the width direction (an inner side (toward the center of the vehicle) and an outer side), and the up-down direction with respect to the vehicle.

Figure 1:
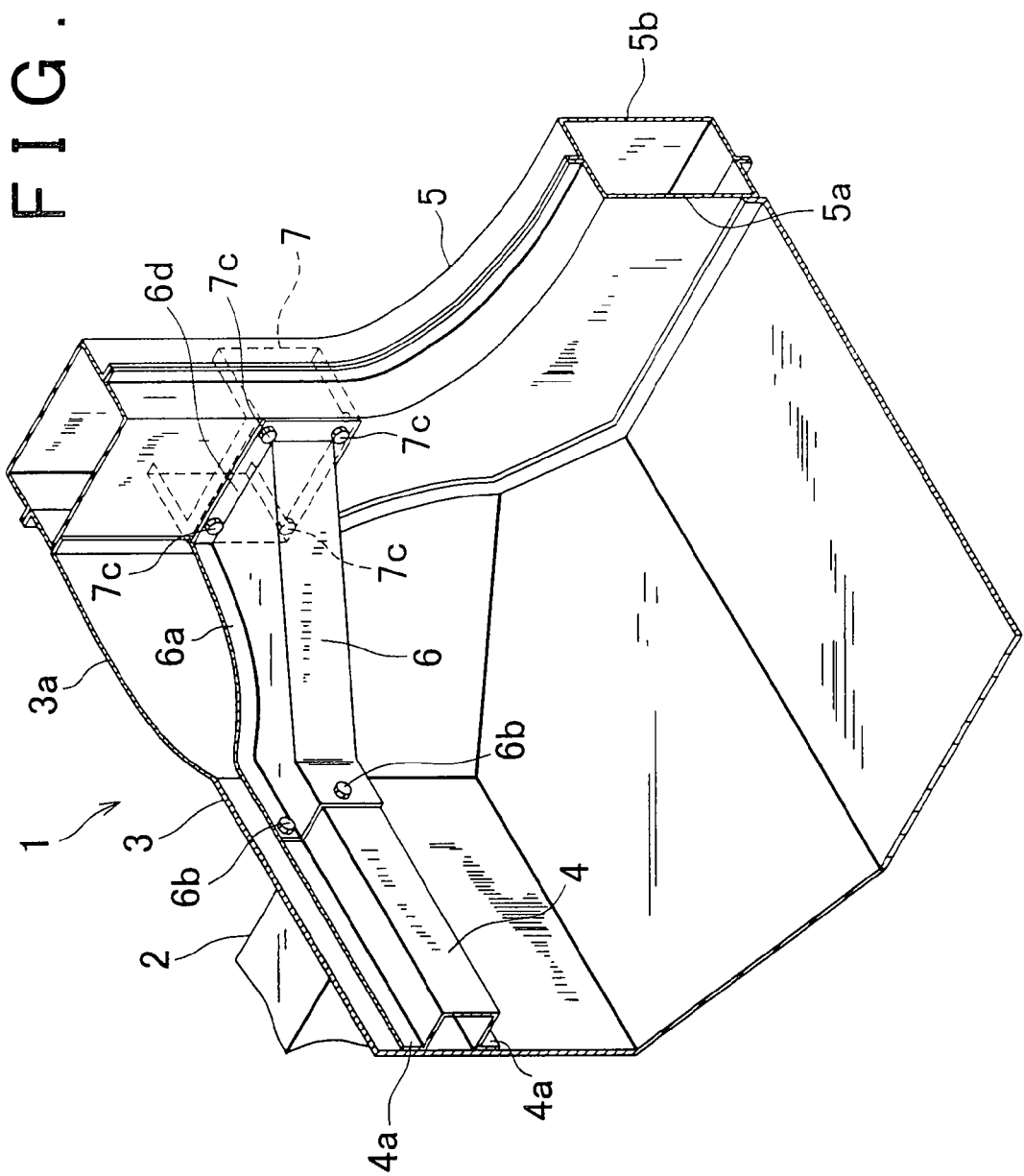
FIG. 1 is a perspective view of a right-rearward portion and its surroundings in a front structure in accordance with a first embodiment of the invention.
Figure 2:
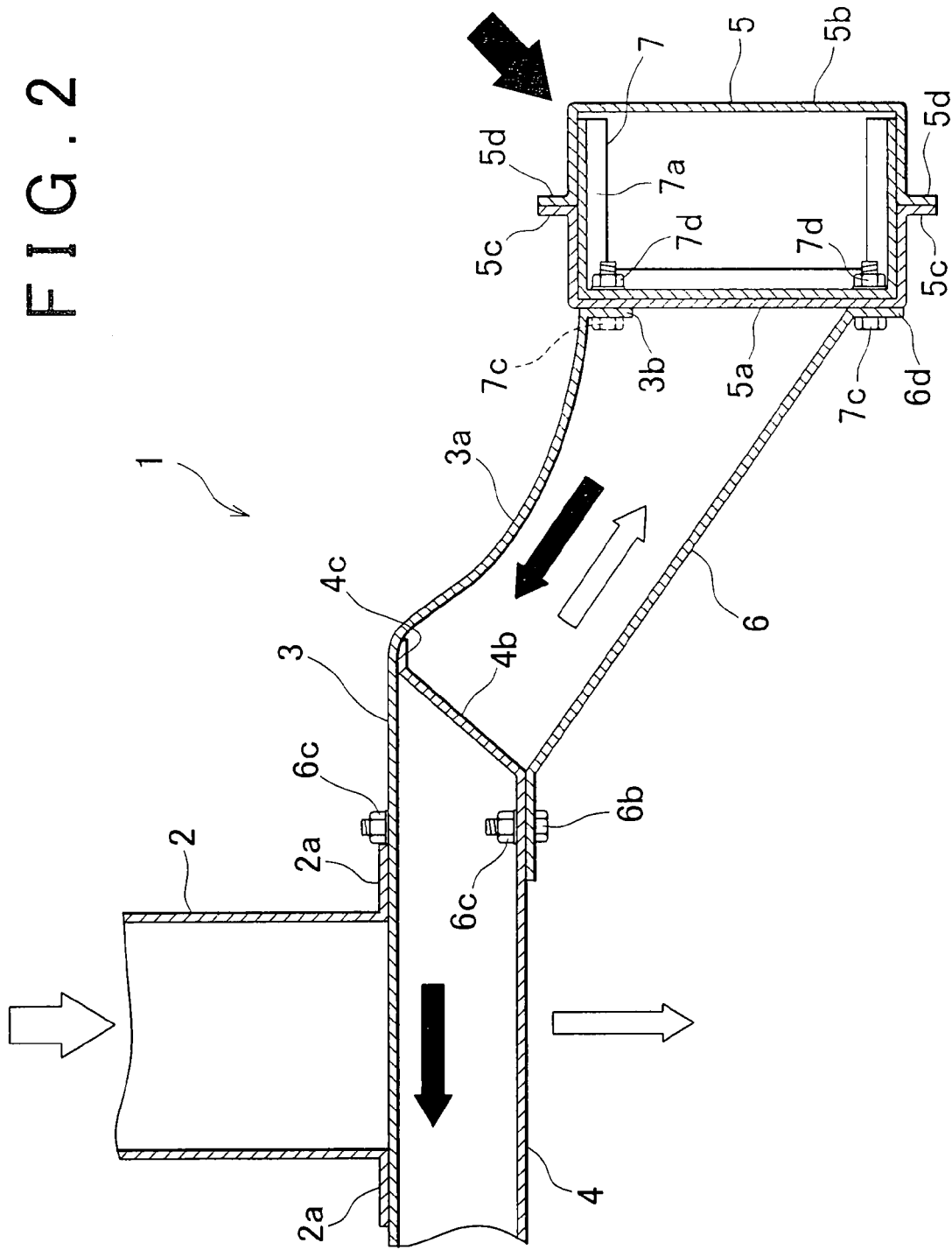
FIG. 2 is a plan sectional view of the right-rearward portion and its surroundings (a section taken at a height position slightly above the middle of a pillar brace) in the front structure in accordance with the first embodiment of the invention.
Figure 3:
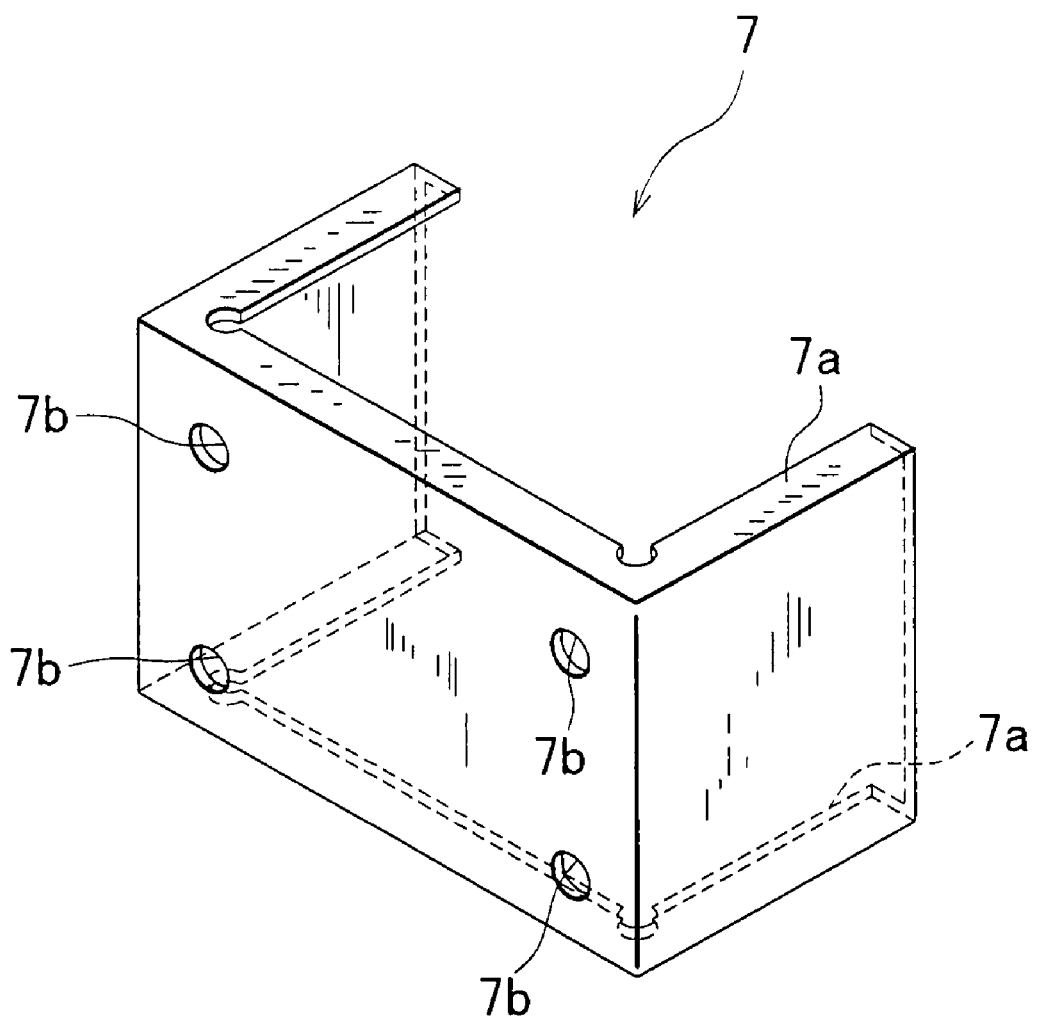
FIG. 3 is a perspective view of a reinforcement member in the front structure in accordance with the first embodiment of the invention.

With reference to FIGS. 1 to 3, a front structure 1 in accordance with a first embodiment of the invention will be described. FIG. 1 is a perspective view of a right-rearward portion and its surroundings in the front structure in accordance with the first embodiment. FIG. 2 is a plan sectional view of the right-rearward portion and its surroundings in the front structure in accordance with the first embodiment (a section taken at a height that is slightly above the middle of the pillar brace). FIG. 3 is a perspective view of a reinforcement member of the front structure in accordance with the first embodiment. Incidentally, although only a right-side structure of the forward structure of the first embodiment is shown in FIGS. 1 and 2 and the like, the forward structure also has a similar structure on the left side.

As shown in FIG. 1, the front structure 1 has a collision absorption structure that absorbs impact caused by a collision that occurs with a vehicle or the like. In particular, the front structure 1 has a structure that is able to restrain the deformation of the front pillars and efficiently disperse the collision load in the case a frontal collision or an angled forward collision and therefore improve the cabin strength. To that end, the front structure 1 includes front side members 2, a dash panel 3, a dash cross-member 4, a front pillar 5, a pillar brace 6, and a reinforcement member 7.

The front side members 2 are a pair of left and right tubular members extending in the longitudinal direction of the vehicle, and are disposed at positions sandwiching an engine (not shown) or the like. The front side members 2 are vehicle skeleton members for improving the strength and rigidity of the vehicle body. The front side members 2 absorb, in the longitudinal direction of the vehicle, the impact load input via a front bumper at the time of a frontal collision. Besides, the front side member 2 transmits a portion of the input impact load to the dash panel 3 or the dash cross-member 4. To that end, as shown in FIG. 2, flanges 2a are formed on two opposite side portions of a rear end of each front side member 2, and the flanges 2a are joined by welding to a front surface of the dash panel 3.

As shown in FIGS. 1 and 2, the dash panel 3 is a plate member that extends in the width direction of the vehicle, and is disposed at a rear end portion of an engine compartment (a front end portion of the cabin). The dash panel 3 is a partition wall member that separates the cabin and the engine compartment. A lower end portion of the dash panel 3 extends to a floor panel (see FIG. 1), and an upper end portion thereof extends to a vicinity of the windshield (not shown). A lower portion of each of two opposite sides of the dash panel 3 forms a curved-surface wheelhouse 3a for housing a front tire. Each of the two opposite end portions of the dash panel 3 extends to a front end portion of an inner side surface of a corresponding one of the front pillars 5 (pillar inner members 5a), and has a flange 3b that is formed to extend along the inner side surface of the front pillar 5. The flange 3b is joined by welding to the inner side surface.

As shown in FIG. 1, the dash cross-member 4 is a member extending in the width direction of the vehicle, and is disposed along the dash panel 3. The dash cross-member 4 has a square-C shape in a section thereof taken in the vertical direction, and is provided with flanges 4a on upper and lower end portions of the square-C shape. The flanges 4a are joined by welding to a rear surface of the dash panel 3. Therefore, the dash cross-member 4, together with the dash panel 3, forms a closed section. Each of two opposite end portions of the dash cross-member 4 in the vehicle width direction has a side surface 4b that extends to an inner end portion of a corresponding one of the wheelhouses 3a, and that connects to the rear surface of the dash panel 3 (see FIG. 2). An outer end of the side surface 4b has a flange 4c that is joined by welding to the rear surface of the dash panel 3. The dash cross-member 4 absorbs, in the width direction of the vehicle, the impact loads transmitted from the front side members 2 and the pillar braces 6. Furthermore, the dash cross-member 4 transmits the input collision load to the pillar braces 6. In order to improve the efficiency of the transmission of collision load, the dash cross-member 4 is disposed at a position that overlaps with a position in the up-down direction (height) at which the front side members 2 are disposed.

As shown in FIG. 1, the front pillars 5 are a pair of left and right tubular members extending in the up-down direction of the vehicle, and are disposed rearward of the two opposite sides of the dash panel 3. Each front pillar 5 has a shape in which an upper portion thereof extends along a side end of the windshield and a lower portion thereof extends along a side end of the dash panel 3. As shown in FIG. 2, each front pillar 5 is made up mainly of a pillar inner member 5a disposed on an inner side and a pillar outer member 5b disposed on an outer side. In each front pillar 5, the pillar inner member 5a has a square-C shape in a section taken in the horizontal direction, and is provided with flanges 5c on two opposite ends (a front side and a rear side) of the square-C shape. Similarly, the pillar outer member 5b has a square-C shape in a section taken in the horizontal direction, and is provided with flanges 5c on two opposite ends (a front side and a rear side) of the square-C shape. Each front pillar 5 is formed by joining the pillar inner member 5a and the pillar outer member 5b by welding with the flange 5c and the flange 5d mating with each other. Each front pillar 5 absorbs the impact load transmitted from the pillar brace 6, in the up-down direction of the vehicle. Besides, each front pillar 5 absorbs the impact load input from the tire or directly at the time of an angled forward collision, in the up-down direction of the vehicle.

As shown in FIG. 1, each pillar brace 6 is a member that links the dash cross-member 4 and the front pillar 5, and is disposed along a corresponding one of the wheelhouses 3a between dash cross-member 4 and a corresponding one of the front pillars 5. As for each pillar brace 6, a cabin-side end portion is coupled to the dash cross-member 4 and the dash panel 3, and an outer-side end portion is coupled to the inner side surface of the front pillar 5. As shown in FIG. 3, each pillar brace 6 has a square-C shape in a section taken in the vertical direction, and is provided with flanges 6a on upper and lower end portions of the square-C shape. As shown in FIG. 1, the flanges 6a are joined by welding to the rear surface of the wheelhouse 3a. Therefore, each pillar brace 6, together with the adjacent wheelhouse 3a, forms a closed section whose front side is of a curved plane along the wheelhouse 3a and whose rear side is of a generally flat plane as shown in FIG. 2. As shown in FIG. 1, an inner side end portion of each pillar brace 6 in the vehicle width direction (a cabin-side end portion thereof) extends so as to provide a predetermined amount of overlap with a side end portion of the dash cross-member 4, and has a shape that fits to the exterior surfaces of the dash cross-member 4. As for the pillar braces 6 and the dash cross-member 4, bolt holes are formed in portions of the bottom portions of the square-C shapes and portions of the flanges that are fittingly overlapped with each other. The dash cross-member 4 and each pillar brace 6 are overlapped, and joined with each other by bolting with bolts 6b and nuts 6c at three sites in the overlapped portions. Thus, the pillar braces 6 are disposed at the same position (height) in the lip-down direction as the dash cross-member 4, and are therefore disposed at positions that overlap with the positions of the front side members 2 in the up-down direction. An outer side end portion of each pillar brace 6 in the vehicle width direction extends to a cabin-side surface of an adjacent one of the front pillars 5 (the pillar inner member 5*a* thereof), and has a square-shape flange 6*d* that extends along the cabin-side surface of the front pillar 5. Four corner portions of the flange 6*d* have bolt holes. The pillar braces 6 transmit collision load input from the dash cross-member 4, to the front pillars 5, and transmit collision load input from the front pillars 5, to the dash cross-member 4. In order to improve the transmission efficiency of the collision load, the length of the outer side end portion of each pillar brace 6 in the vehicle longitudinal direction is set at such a length as to extend fully to the rear end of the cabin-side surface of the front pillar 5 in the vehicle longitudinal direction. In addition, the juncture of the outer side end portion of each pillar brace 6 will be described.

As shown in FIG. 2, a reinforcement member 7 is a member for heightening the strength of each front pillar 5, and is disposed within each front pillar 5. As shown in FIG. 3, each reinforcement member 7 has a shape that is generally adopted for a reinforcement member, and specifically has a square-C shape in a section taken in the horizontal direction, and an upper end portion and a lower end portion thereof are provided with flanges 7*a* extending inward with respect to the square-C shape. Each reinforcement member 7 has such a size as to be placed within the front pillars 5 and fit to the front surface, the inner side surface, and the rear side of each front pillar 5. The length of the inner side surface of each reinforcement member 7 is substantially the same as (slightly shorter than) the length of the inner side surface of the front pillar 5. The lengths of the front surface and the rear surface of each reinforcement member 7 in the vehicle width direction are set so as to fill the front pillar 5 in the width direction. The length of the reinforcement members 7 in the up-down direction is set so as to exceed the length of the pillar braces 6 including the flange 6*d* in the up-down direction, by small amounts of length above and below the pillar braces 6. As shown in FIG. 3, four corner portions of the inner side surface of each reinforcement member 7 have bolt holes 7*b* at positions that correspond one-to-one to the bolt holes formed in the flange 6*d* of a corresponding one of the foregoing pillar braces 6.

On each of the left and right sides of the vehicle front structure, as shown in FIG. 1, the reinforcement member 7 within the front pillar 5 is disposed at the same position in the up-down direction (the same height) as the pillar brace 6, and the bolt holes 7*b* of the reinforcement member 7 are aligned with the corresponding bolt holes of the flange 6*d*, with the pillar inner member 5*a* sandwiched therebetween. Then, as shown in FIG. 2, the reinforcement member 7 and the pillar brace 6 are joined at the four sites by bolting with bolts 7*c* and nuts 7*d*, with the pillar inner member 5*a* sandwiched between the reinforcement member 7 and the pillar brace 6. Furthermore, the front surface and the rear surface of the reinforcement member 7 may be joined by welding to the front surface and the rear surface of the front pillar 5. Due to the arrangement of the members as described above, the front side members 2, the dash cross-member 4, the pillar braces 6 and the reinforcement members 7 are disposed at the same height position. Each reinforcement member 7 heightens the strengths of the front surface, the rear surface and the inner side surface of the front pillar 5, and also heightens the strengths of the corner portion connecting the front surface and the inner side surface of the front pillar 5, and the corner portion connecting the rear surface and the inner side surface of the front pillar 5, and also heightens the coupling strength between the pillar brace 6 and the front pillar 5. This improves the strength of each front pillars 5 itself (the bending strength, the torsion strength, etc.), and also improves the transmission efficiency of the collision load between the front pillars 5 and the pillar braces 6.

Operation of the front structure 1 will be described with reference to FIG. 2. The following description will be made in conjunction with the case of a frontal collision between vehicles and the like, and the case of an angled forward collision between vehicles and the like. In FIG. 2, the collision loads in the case of a head-on collision are shown by white arrows, and the collision loads in the case of an angled forward collision are shown by black arrows.

Firstly, the description will be described in conjunction with the case of the head-on collision. A load caused by the collision is transmitted to the front side members 2 via a bumper. The front side members 2 absorb a portion of the collision load, and transmit the amount of collision load that cannot be absorbed to the dash panel 3 and the dash cross-member 4. The dash cross-member 4 absorbs a portion of the transmitted collision load, and transmits the amount of collision load cannot be absorbed to the pillar braces 6. The pillar braces 6 transmit the transmitted collision load to the front pillars 5. The front pillars 5 firmly receive the collision load, and transmit it to the entire skeleton, and absorbs it by the entire skeleton. At this time, the reinforcement members 7 restrain the deformation of the front pillars 5 (in particular, the pillar inner members 5*a*), so that the pillar braces 6 and the front pillars 5 remain strongly coupled. Therefore, the collision load can be efficiently transmitted from the pillar braces 6 to the front pillars 5. Besides, since the front pillars 5 on both sides of the vehicle firmly support the two opposite ends of the dash cross-member 4, the dash cross-member 4 can also adequately absorb collision load, and the deformation of the dash cross-member 4 to the cabin side can be restrained. Thus, the collision load can be efficiently dispersed, and the collision load can be absorbed in various directions, such as the vehicle longitudinal directions, the left and right directions, and the up-down directions.

Now, the description will be made in conjunction with the case of the angled forward collision. A load by the collision is input to one of the front pillars 5 directly or via the adjacent tire. The front pillar 5 transmits a portion of the collision load to the entire skeleton and thus absorbs load by the entire skeleton, and transmits the amount of collision load cannot be absorbed, to the pillar brace 6. The pillar brace 6 transmits the transmitted collision load to the dash cross-member 4. The dash cross-member 4 absorbs the collision load. At this time, the reinforcement member 7 restrains the deformation of the front pillar 5 toward the cabin side, so that the pillar brace 6 and the front pillar 5 remain strongly coupled. Therefore, the collision load is efficiently transmitted from the front pillar 5 to the pillar brace 6. Besides, since the front pillars 5 on both sides of the vehicle firmly support the two opposite ends of the dash cross-member 4, the dash cross-member 4 can adequately absorb collision load.

According to the front structure 1, at the height position at which the front pillars 5 and the pillar braces 6 are coupled, the strengths of the inner side surface itself, the strengths of the front surface itself and the rear surface itself of each front pillar 5 and the strengths of the corner portion between the front surface and the inner side surface, and the corner portion between the rear surface and the inner side surface of each front pillar 5 are heightened. Therefore, at the time of a collision, the deformation of the front pillars can be suppressed. Furthermore, the transmission efficiency of collision load improves, so that the collision load can be effectively dispersed. As a result, the cabin strength improves (i.e., the deformation of the dash cross-member 4 and the front pillars 5 toward the cabin is restrained), and the safety at the time of collision improves. In the front structure 1, the simple construction in which the reinforcement members 7 are disposed within the front pillars 5 and the reinforcement members 7 are coupled to the pillar braces 6 can heighten the strengths of the front surface, the inner side surface and the rear surface of each front pillar 5 and the strengths of the corner portion between the front surface and the inner side surface, and the corner portion between the rear surface and the inner side surface of each front pillar 5. Besides, in the front structure 1, since the reinforcement members 7 are coupled by bolting to the pillar braces 6, with the pillar inner members 5a sandwiched therebetween, the efficiency of the transmission of collision load between the front pillars 5 and the pillar braces 6 further improves.

Furthermore, in the front structure 1, since the dash cross-member 4, the pillar braces 6 and the reinforcement members 7 are disposed at the same position in the up-down direction as the front side members 2, the collision load from the front side members 2 can be efficiently transmitted to the dash cross-member 4, the pillar braces 6 and the front pillars 5.

In the front structure 1, reinforcement members 7 in a commonly adopted shape may be applied, whereby the reinforcement member 7 can easily be produced and the cost can be reduced. Furthermore, in the front structure 1, the reinforcement members 7 have an inner side surface, a front surface and a rear surface, which are joined to the corresponding surfaces of the front pillars 5. Therefore, the strength of the front pillars 5 themselves improves, and the efficiency of the transmission of collision load between the front pillars 5 and the pillar braces 6 further improves. Besides, in the front structure 1, since the front surface and the rear surface of each reinforcement member 7 have such a length in the width direction as to substantially fully fill the interior space of each front pillars 5 in the width direction, the strength of each front pillar 5 itself further improves, and the efficiency of the transmission of collision load between the front pillars 5 and the pillar braces 6 further improves. Besides, in the front structure 1, since the length of the reinforcement members 7 in the up-down direction is longer than or equal to the length of the pillar braces 6 in the up-down direction, the efficiency of the transmission of collision load between the front pillars 5 and the pillar braces 6 further improves.

Figure 4:
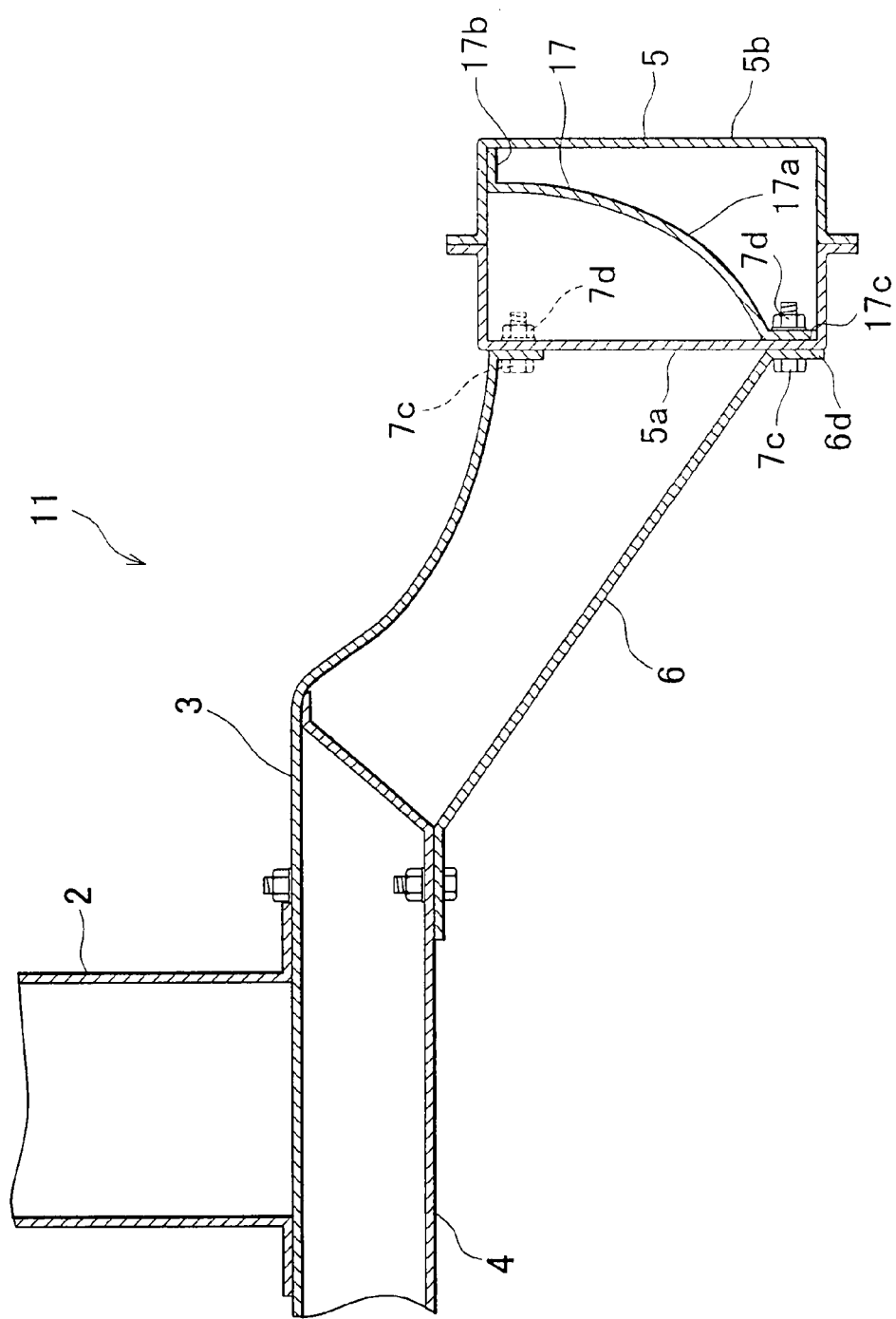
FIG. 4 is a plan sectional view of a right-rearward portion and its surroundings in a front structure in accordance with a second embodiment of the invention.
Figure 5:
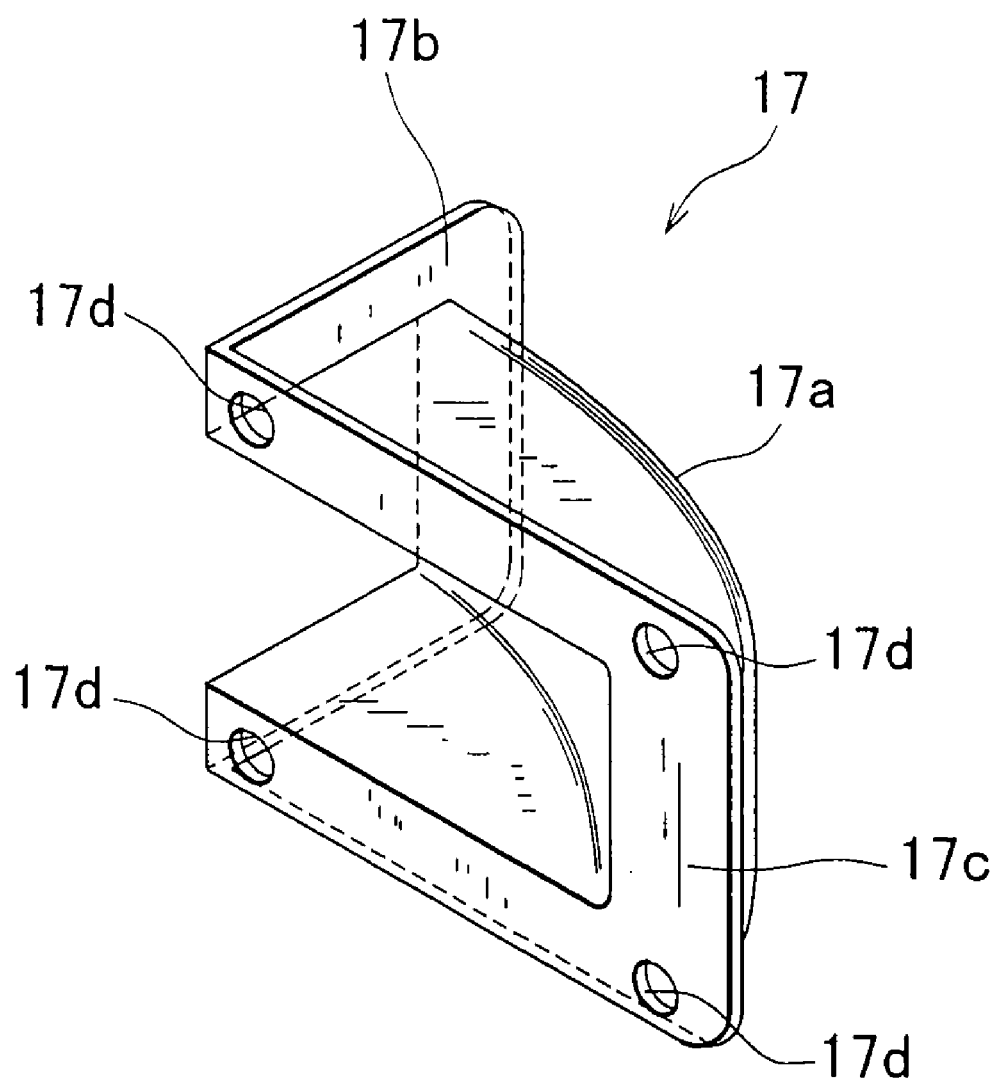
FIG. 5 is a perspective view of a reinforcement member in the front structure in accordance with the second embodiment of the invention.

A front structure 11 in accordance with a second embodiment will be described with reference to FIGS. 4 and 5. FIG. 4 is a plan sectional view of a right-rearward portion and its surroundings in a front structure in accordance with the second embodiment. FIG. 5 is a perspective view of a reinforcement member of the front structure in accordance with the second embodiment. Incidentally, with regard to the front structure 11, constructions substantially the same as those of the front structure 1 in accordance with the first embodiment are suffixed with the same reference characters, and the description thereof will be omitted.

As shown in FIG. 4, the front structure 11 has substantially the same collision absorption structure as the front structure 1, but is different from the front structure 1 in the shape of reinforcement members 17.

As shown in FIG. 4, the reinforcement members 17 are members for heightening the strength of front pillars 5, and are disposed within the front pillars 5. On each of the left and right sides of the front structure 11, the reinforcement member 17 has a curved portion 17a that is disposed within the front pillar 5 and that extends from an outer side of a front end of the front pillar 5 to an rearward inner side so as to cover the front surface and the inner side surface. That is, the curved portion 17a extends from an outer side portion of the front end of the front pillar 5 in the vehicle width direction to an inner side portion of the rear end of the front pillar 5, and is curved so as to be swollen toward the rear of the vehicle. As shown in FIG. 5, the front end portion of the curved portion 17a has a square-C shape flange 17b that extends along the front surface of the front pillar 5. Besides, a cabin-side end portion of the curved portion 17a has a square-C shape flange 17c that extends along the inner side surface of the front pillar 5 (pillar inner member 5a). The flange 17b and the flange 17c are continuously connected perpendicularly to each other at corner portions of the front end on the cabin side. Four corner portions of the flange 17c have bolt holes 17d at positions that correspond one-to-one to the bolt holes formed in the flange 6d of the pillar brace 6. The length of the cabin-facing side of the reinforcement member 17 in the vehicle longitudinal direction is set so as to substantially fully fill the interior space of the front pillar 5 in the longitudinal direction. The length of the front side of the reinforcement member 17 in the vehicle width direction is set so as to substantially fully fill the interior space of the front pillar 5 in the width direction. The length of the reinforcement member 17 in the up-down direction is set so as to exceed the length of the pillar brace 6 including the flange 6d in the up-down direction, by small amounts of length above and below the pillar brace 6.

As shown in FIG. 4, the reinforcement member 17 is disposed within the front pillar 5 at the same positions in the up-down direction as the pillar brace 6, and the bolt holes 17d are aligned with the corresponding bolt holes of the flange 6d, with the pillar inner member 5a sandwiched therebetween. Then, the reinforcement member 17 and the pillar brace 6 are joined at the four sites by bolting with bolts 7c and nuts 7d, with the pillar inner member 5a sandwiched between the reinforcement member 17 and the pillar brace 6. Furthermore, the flange 17b of the reinforcement member 17 may be joined by welding to the front surface and the rear surface of the front pillar 5. Due to the arrangement of the members as described above, the front side members 2, the dash cross-member 4, the pillar braces 6 and the reinforcement members 17 are disposed at the same height position. Each reinforcement member 17 heightens the strengths of the front surface and the inner side surface of the front pillar 5, and the strength thereof in an oblique direction from the front end outer side portion to the inner side rearward portion, and also heightens the strength of the corner portion connecting the front surface and the inner side surface of the front pillar 5, and also heightens the coupling strength between the pillar brace 6 and the front pillar 5.

In the case of a head-on collision and an angled forward collision, the front structure 11 having the reinforcement members 17 as described above operates substantially in the same manner as the front structure 1 as described in conjunction with the first embodiment.

This front structure 11 achieves substantially the same effects as the front structure 1. In particular, in the front structure 11, since each reinforcement member 17 includes the curved portion 17a that extends from the front end outer side portion of the front pillar 5 to the inner side rearward portion thereof, the strength of the front pillar 5 in an oblique direction is high. Thus, the front structure 11 is suitable for the collision load input obliquely from front.

Figure 6:
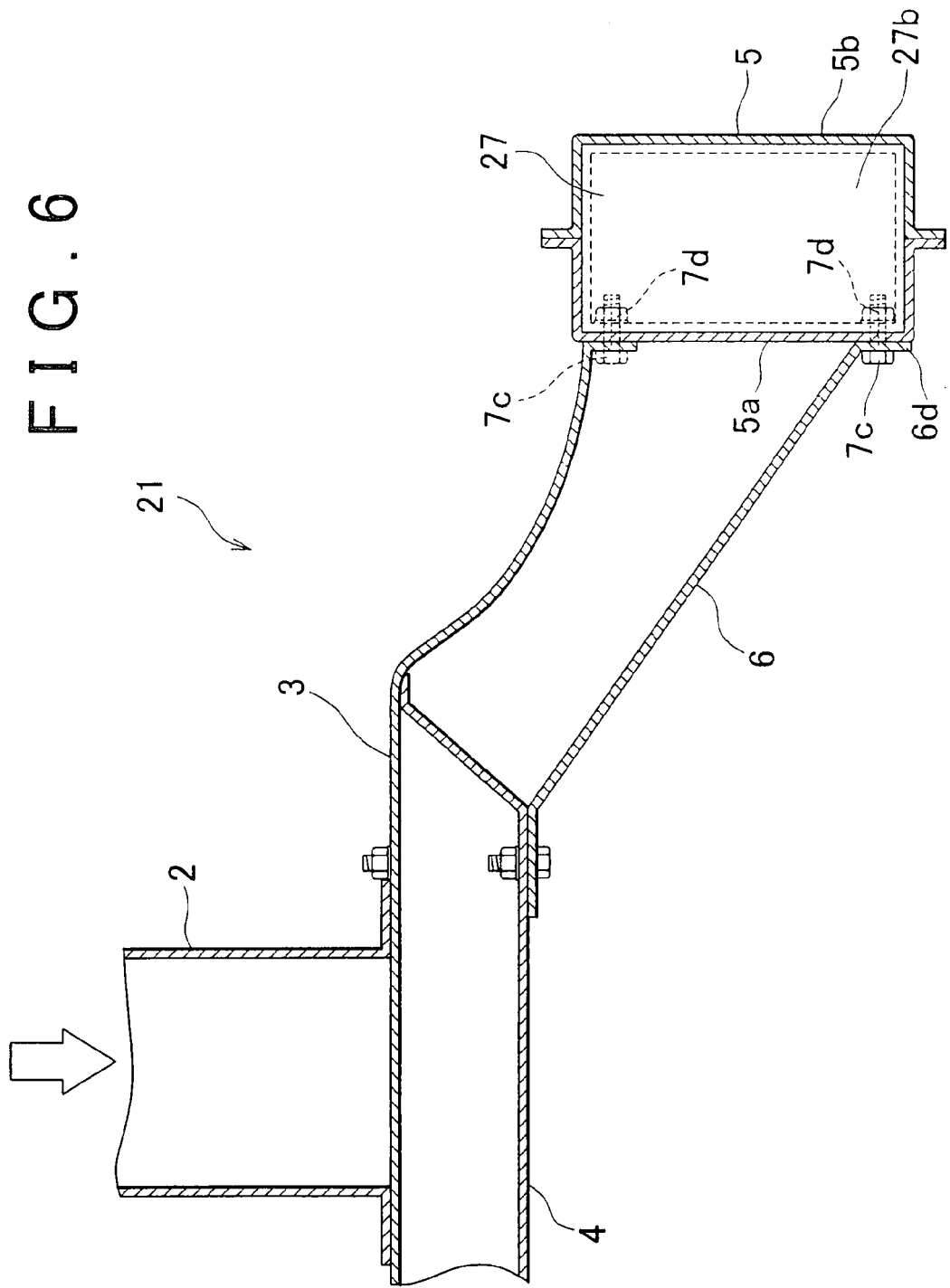
FIG. 6 is a plan sectional view of a right-rearward portion and its surroundings in a front structure in accordance with a third embodiment of the invention.
Figure 7:
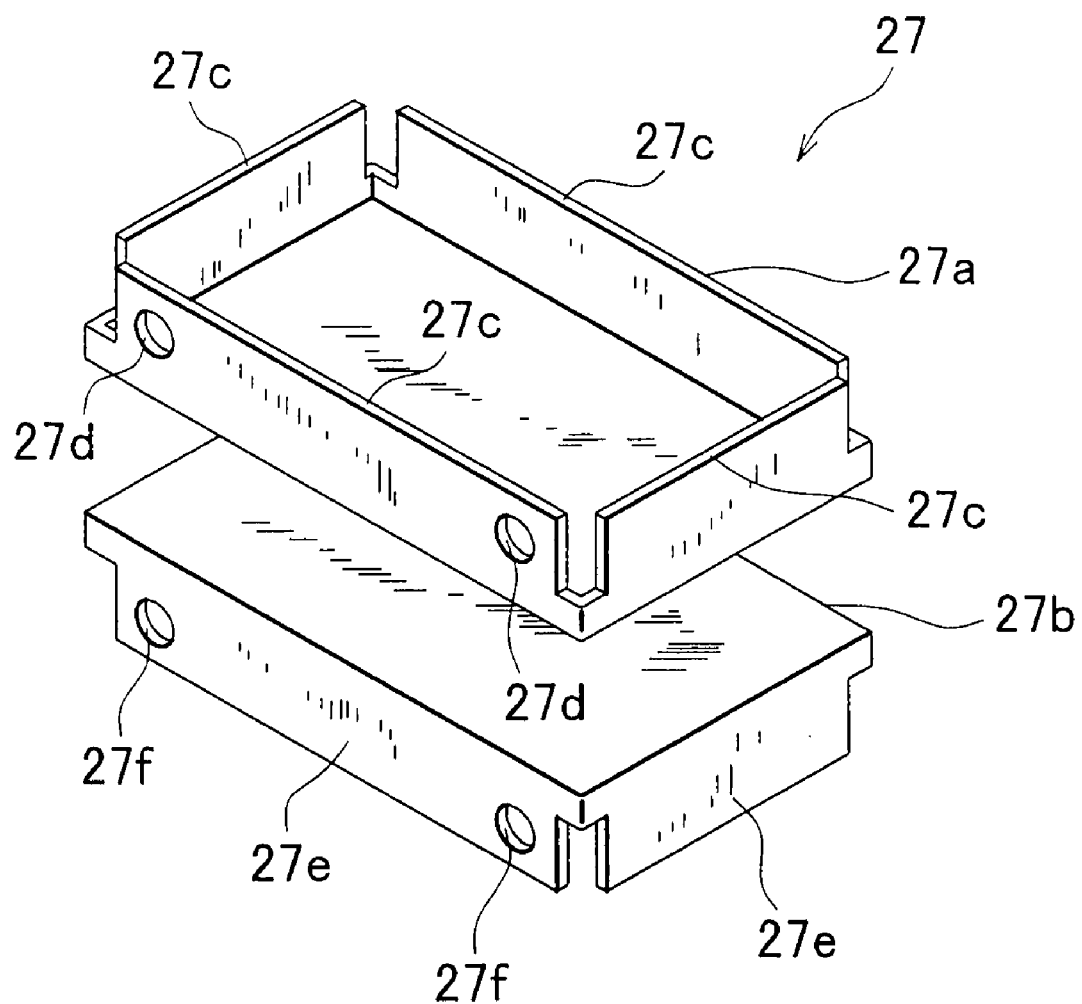
FIG. 7 is a perspective view of a reinforcement member in the front structure in accordance with the third embodiment of the invention.

A front structure 21 in accordance with a third embodiment will be described with reference to FIGS. 6 and 7. FIG. 6 is a plan sectional view of a right-rearward portion and its surroundings in a front structure in accordance with the third embodiment. FIG. 7 is a perspective view of a reinforcement member of the front structure in accordance with the third embodiment. Incidentally, with regard to the front structure 21, constructions substantially the same as those of the front structure 1 in accordance with the first embodiment are suffixed with the same reference characters, and the description thereof will be omitted.

The front structure 21 has substantially the same collision absorption structure as the front structure 1, but is different from the front structure 1 in the shape of reinforcement members 27.

As shown in FIG. 6, the reinforcement members 27 are members for heightening the strength of front pillars 5, and are disposed within the front pillars 5. As shown in FIG. 7, each reinforcement member 27 has a shape that is commonly adopted for a reinforcement member, and is made up of a pair of upper and lower members (the upper member 27*a* and the lower member 27*b*). The upper member 27*a* and the lower member 27*b* are each a plate member having a size that fits into a section of the front pillar 5 in the horizontal direction. The upper member 27*a* has flanges 27*c* that extend upward from end portions of four sides of upper member 27*a* having a generally rectangular shape. The flanges 27*c* extend along the interior surfaces of the front pillar 5. Of the four flanges, the inner side surface-side flange 27*c* has two bolt holes 27*d* at positions that correspond one-to-one to the two upper bolt holes formed in a flange 6*d* of a pillar brace 6. The lower member 27*b* has four flanges 27*e* that extend downward from end portions of four sides of the lower member 27*b* having a generally rectangular shape. The flanges 27*e* extend along interior surfaces of the front pillar 5. Of the four flanges, the inner side surface-side flange 27*e* has two bolt holes 27*f* at positions that correspond one-to-one to the two lower bolt holes formed in the flange 6*d* of the pillar brace 6. Incidentally, the upper member 27*a* may instead have a construction in which flanges extend downward from the end portions of the four sides of the upper member 27*a* having a generally rectangular shape, similar to the construction of the lower member 27*b*, or may also have a construction in which flanges extend both upward and downward from the end portions. Besides, the lower member 27*b* may instead have a construction in which flanges extend upward from the end portions of the four sides of the lower member 27*b* having a generally rectangular shape, similar to the construction of the upper member 27*a*, or may also have a construction in which flanges extend both upward and downward from the end portions.

As shown in FIG. 6, the upper member 27*a* is disposed within the front pillar 5 so that the two bolt holes 27*d* are aligned in position with the two upper bolt holes of the pillar brace 6. On the other hand, the lower member 27*b* is disposed within the front pillar 5 so that the two bolt holes 27*f* are aligned in position with the two lower bolt holes of the pillar brace 6. Then, the upper member 27*a*, the lower member 27*b* and the pillar brace 6 are joined at the four sites by bolting with bolts 7*c* and nuts 7*d*, with the pillar inner member 5*a* sandwiched therebetween. Furthermore, the other flanges 27*c*, 27*e* of the reinforcement member 27 may be joined by welding to the front surface, the rear surface and the outer side surface of the front pillar 5. Due to the arrangement of the members as described above, the front side members 2, the dash cross-member 4, the pillar braces 6 and the reinforcement members 27 are disposed at the same height position. Each reinforcement member 27 heightens the strengths of the front surface, the rear surface, the inner side surface and the outer side surface of the front pillar 5, and also heightens the strengths of the corner portion connecting the front surface and the inner side surface of the front pillar 5, the corner portion connecting the front surface and the outer side surface thereof, the corner portion connecting the rear surface and the inner side surface thereof and the corner portion connecting the rear surface and the outer side surface thereof, and also heightens the coupling strength between the pillar brace 6 and the front pillar 5.

In the case of a head-on collision and an angled forward collision, the front structure 21 having the reinforcement members 27 as described above operates substantially in the same manner as the front structure 1 as described in conjunction with the first embodiment.

This front structure 21 achieves substantially the same effects as the front structure 1. In particular, in the front structure 21, since each reinforcement member 27 has a shape that fits into a section of the front pillar 5, and is joined to all the interior surfaces of the front pillar 5, the strength of the front pillar 5 is high in all directions. Thus, the front structure 21 is suitable for the collision impact from any direction.

Figure 8:
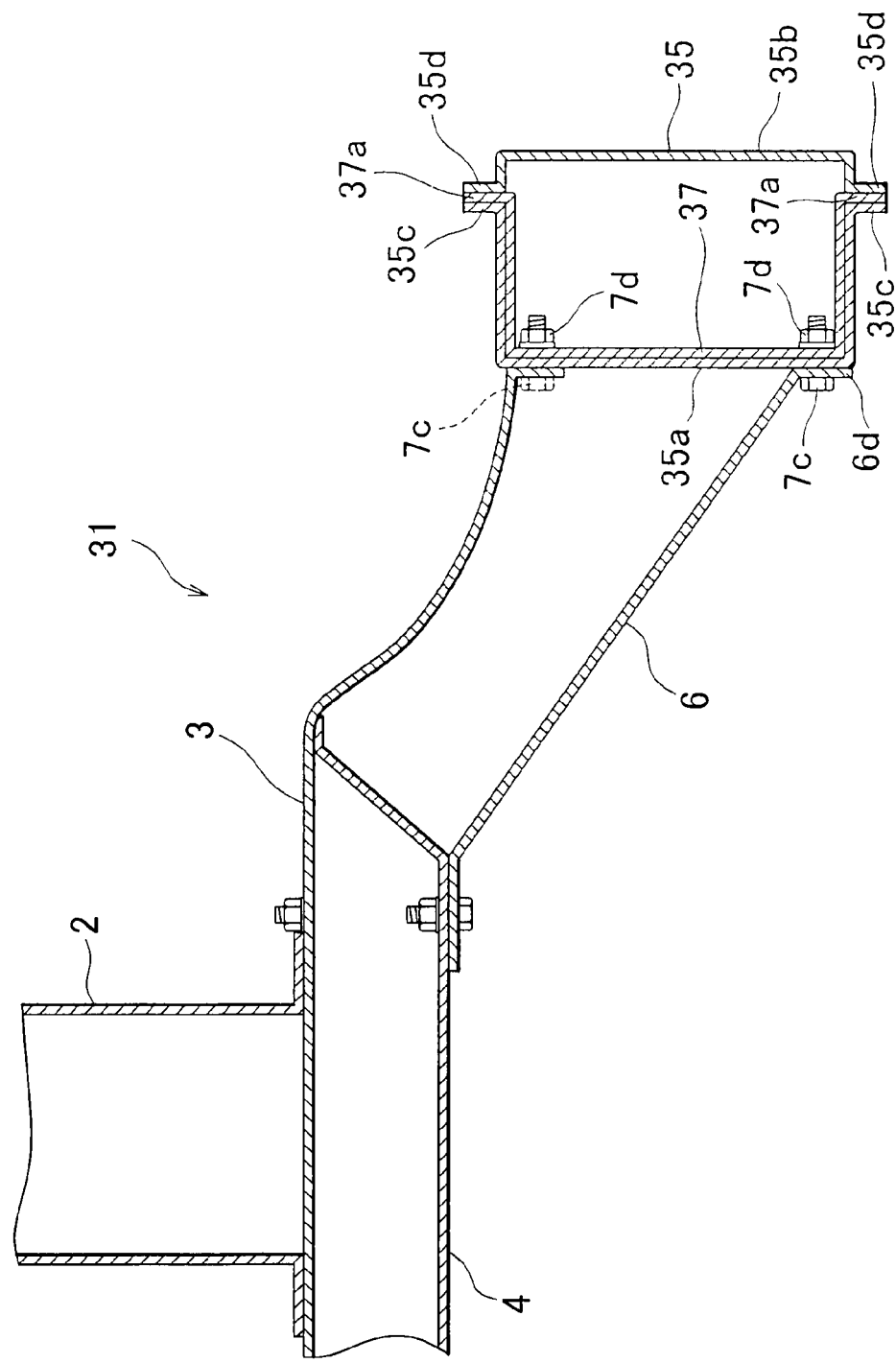
FIG. 8 is a plan sectional view of a right-rearward portion and its surroundings in a front structure in accordance with a fourth embodiment of the invention.
Figure 9:
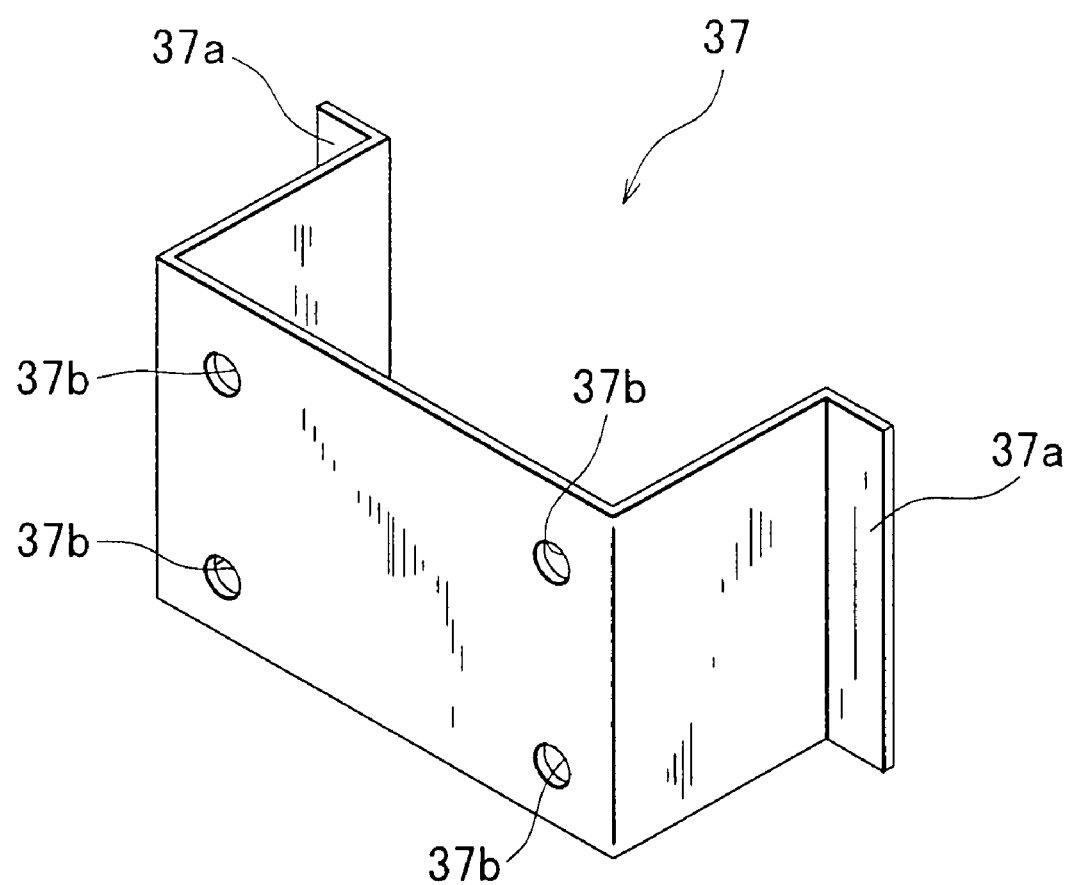
FIG. 9 is a perspective view of a reinforcement member in the front structure in accordance with the fourth embodiment of the invention.

A front structure 31 in accordance with a fourth embodiment will be described with reference to FIGS. 8 and 9. FIG. 8 is a plan sectional view of a right-rearward portion and its surroundings in a front structure in accordance with the fourth embodiment. FIG. 9 is a perspective view of a reinforcement member of in accordance with the fourth embodiment. Incidentally, with regard to the front structure 31, constructions substantially the same as those of the front structure 1 in accordance with the first embodiment are suffixed with the same reference characters, and the description thereof will be omitted.

The front structure 31 has substantially the same collision absorption structure as the front structure 1, but is different from the front structure 1 in the shape of reinforcement members 37 and the shape of front pillars 35. As for each front pillar 35, the length of a pillar inner member 35*a* in the vehicle width direction is longer and the length of a pillar outer member 35*b* in the width direction is shorter than in the front pillars in the first embodiment.

As shown in FIG. 8, the reinforcement members 37 are members for heightening the strength of the front pillars 35, and are disposed within the front pillars 35. As shown in FIG. 9, each reinforcement member 37 has a shape that is generally adopted for a reinforcement member, that is, has a square-C shape in a section taken in the horizontal direction, and is provided with flanges 37*a* extending from an outer-end front side and an outer-end rear side of the square-C shape. Each reinforcement member 37 has a size that fits to the interior surfaces of the pillar inner member 35*a*. The length of the cabin-side surface of each reinforcement member 37 in the vehicle longitudinal direction is substantially the same as the length of the inner side surface of each front pillar 35. The length of the front surface and the rear surface of each reinforcement member 37 in the vehicle width direction is substantially the same as the length of pillar inner members 35*a* in the width direction. The length of the reinforcement member 37 in the up-down direction is set so as to exceed the length of the pillar brace 6 including the flange 6*d* in the up-down direction, by small amounts of length above and below the pillar brace 6. Four corner portions of the inner side surface of the reinforcement member 37 have bolt holes 37*b* at positions that correspond one-to-one to the bolt holes formed in the flange 6*d* of the pillar brace 6.

On each of the left and right sides of the front structure 31, as shown in FIG. 8, the reinforcement member 37 is disposed within the front pillar 35 at the same position in the up-down direction as the pillar brace 6. The bolt holes 37*b* are aligned with the corresponding bolt holes of the flange 6*d* of the pillar brace 6, with a pillar inner member 35*a* sandwiched between the reinforcement member 37 and the pillar brace 6. Besides, the front and rear flanges 37*a* of the reinforcement member 37 are sandwiched between flanges 35c of the pillar inner member 35a and flanges 35d of a pillar outer member 35b. Then, the reinforcement member 37 and the pillar brace 6 are joined at the four sites by bolting with bolts 7c and nuts 7d, with the pillar inner member 35a sandwiched therebetween. Besides, the front and rear flanges 37a are joined by welding to the flanges 35c and the flanges 35d. Furthermore, the front surface and the rear surface of the reinforcement member 37 may also be joined by welding to the front surface and the rear surface of the front pillar 35. Due to the arrangement of the members as described above, the front side members 2, the dash cross-member 4, the pillar braces 6 and the reinforcement members 37 are disposed at the same height position. Each reinforcement member 37 heightens the strengths of the front surface, the rear surface and the inner side surface of the front pillar 35, and also heightens the strengths of the corner portion connecting the front surface and the inner side surface of the front pillar 35, and the corner portion connecting the rear surface and the inner side surface thereof, and also heightens the coupling strength between the pillar brace 6 and the front pillar 35.

In the case of a head-on collision and an angled forward collision, the front structure 31 having the reinforcement members 37 as described above operates substantially in the same manner as the front structure 1 as described in conjunction with the first embodiment.

This front structure 31 achieves substantially the same effects as the front structure 1. In particular, the front structure 31 is suitable for the front pillars 35 in which the length of the pillar inner member 35a in the vehicle width direction is long and the length of the pillar outer member 35b in the width direction is short.

Figure 10:
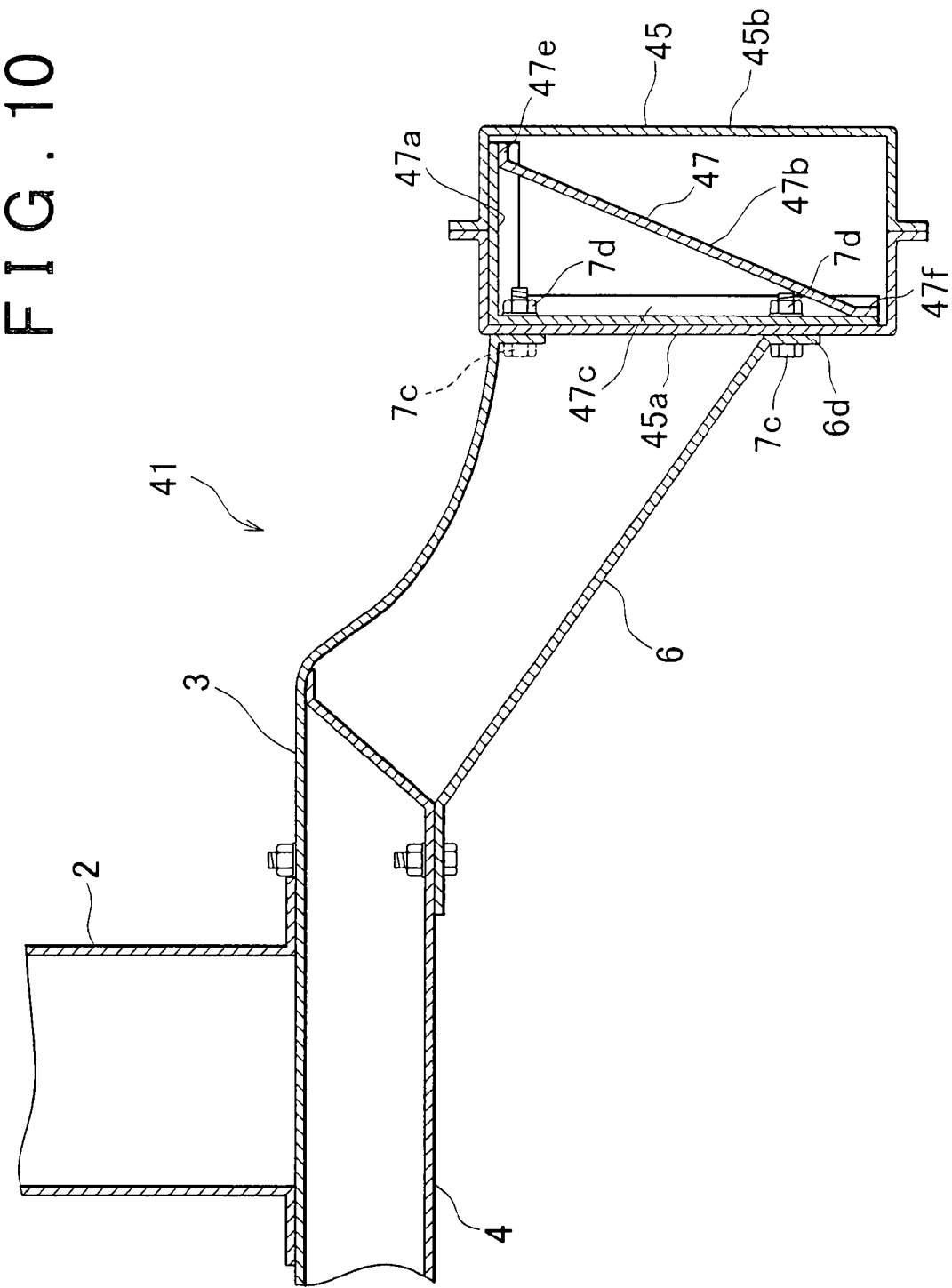
FIG. 10 is a plan sectional view of a right-rearward portion and its surroundings in a front structure in accordance with a fifth embodiment of the invention.
Figure 11:
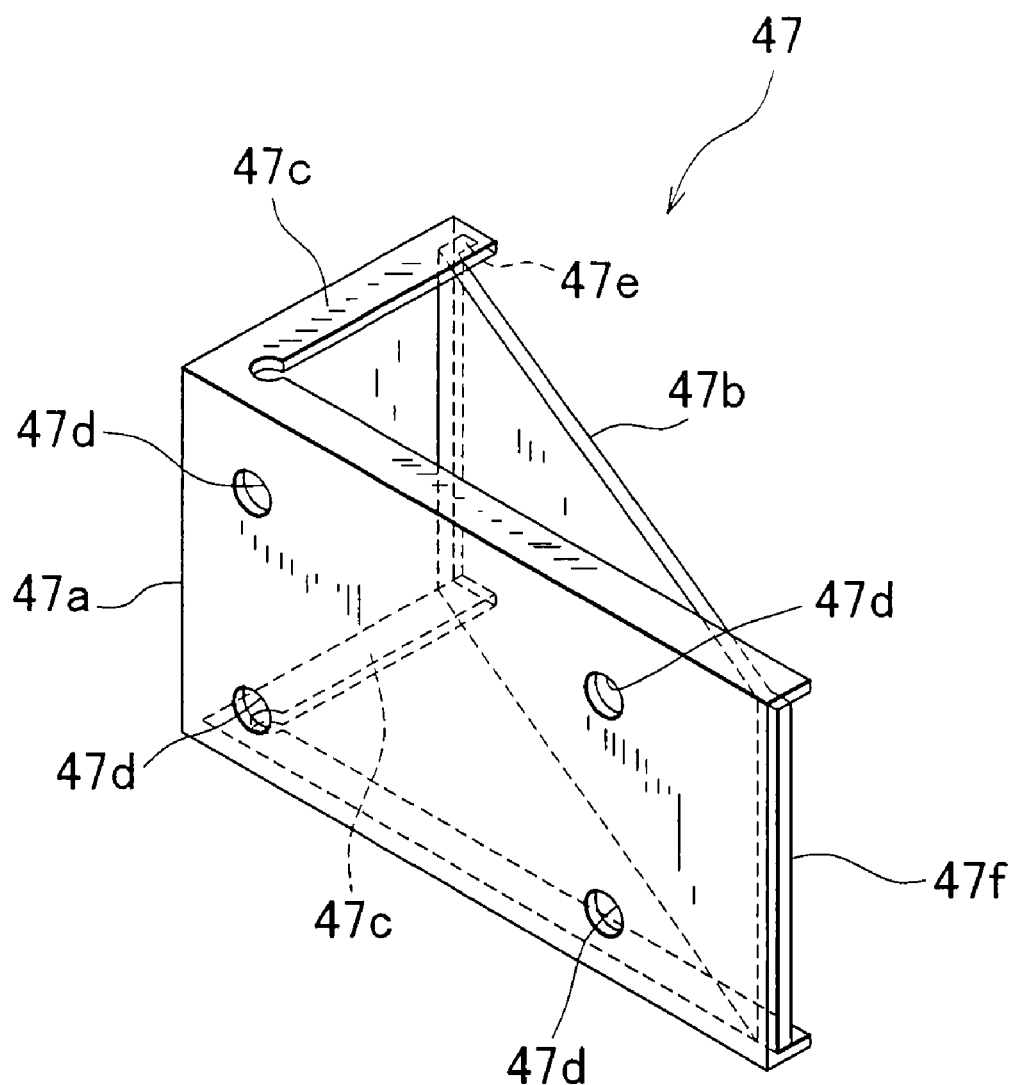
FIG. 11 is a perspective view of a reinforcement member in the front structure in accordance with the fifth embodiment of the invention.

A front structure 41 in accordance with a fifth embodiment will be described with reference to FIGS. 10 and 11. FIG. 10 is a plan sectional view of a right-rearward portion and its surroundings in a front structure in accordance with the fifth embodiment. FIG. 11 is a perspective view of a reinforcement member of the front structure in accordance with the fifth embodiment. Incidentally, with regard to the front structure 41, constructions substantially the same as those of the front structure 1 in accordance with the first embodiment are suffixed with the same reference characters, and the description thereof will be omitted.

The front structure 41 has substantially the same collision absorption structure as the front structure 1, but is different from the front structure 1 in the shape of reinforcement members 47 and the shape of front pillars 45. The front pillars 45 are longer in the length in the vehicle longitudinal direction than the front pillars 5 provided in the first embodiment. Therefore, on each of the left and right sides of the front structure 41, when a pillar brace 6 is joined to the front pillar 45, the front pillar 45 extends further rearward of a rear end of a flange 6d of the pillar brace 6, in comparison with the first embodiment. Incidentally, instead of the front pillars 45 being relatively long in the vehicle longitudinal direction, an outer side of each pillar brace 6 may be relatively short in the vehicle longitudinal direction. In either case, the rear end of the flange of the pillar brace does not extend fully to the rear end of the front pillar, but the rear end of the flange of the pillar brace terminates so as to provide a predetermined amount of space between the rear end of the flange of the pillar brace and the rear end of the front pillar. This space is needed in relation to the structure of a reinforcement member 47 on each of the left and right sides of the front structure 41.

As shown in FIG. 10, the reinforcement members 47 are provided for heightening the strength of the front pillars 45, and are disposed within the front pillars 45. Each reinforcement member 47 is made up of two members: a body member 47a and a diagonal member 47b. The body member 47a is a plate member whose section in the horizontal direction is an L-shape, and is joined to the inner side surface and the front surface of the front pillar 45 (a pillar inner member 45a). As for each reinforcement member 47, the length of the cabin-side surface of the body member 47a in the vehicle longitudinal direction is set so as to fully fill the interior space of the front pillar 45 in the vehicle longitudinal direction. The length of the front surface of the body member 47a in the vehicle width direction is set so as to substantially fully fill the interior space of the front pillar 45 in the width direction. An upper end and a lower end of the body member 47a are provided with flanges 47c extending inward with respect to the L-shape body member 47a. Four corner portions of the inner side surface of the body member 47a have bolt holes 47b at positions that correspond one-to-one to the bolt holes formed in the flange 6d of the pillar brace 6. The diagonal member 47b is a plate member having such a length as to connect the front surface of the body member 47a and the cabin-side surface of the body member 47a. A front end of the diagonal member 47b is provided with a flange 47e, and a rear end of the diagonal member 47b is provided with a flange 47f. The diagonal member 47b is disposed extending from an outer end of the front surface to a rear end of the cabin-side surface of the body member 47a. The flange 47e is joined by welding to the front surface of the body member 47a, and the flange 47f is joined by welding to the cabin-side surface of the body member 47a. Therefore, each reinforcement member 47 has a triangular shape in a section taken in the horizontal direction.

On each of the left and right sides of the front structure 41, as shown in FIG. 10, the reinforcement member 47 is disposed within the front pillar 45 at the same position in the up-down direction as the pillar brace 6. The bolt holes 47b are aligned with the corresponding bolt holes of the flange 6d of the pillar brace 6, with a pillar inner member 45a sandwiched between the reinforcement member 47 and the pillar brace 6. Then, the reinforcement member 47 and the pillar brace 6 are joined at the four sites by bolting with bolts 7c and nuts 7d, with the pillar inner member 45a sandwiched therebetween. Furthermore, the front surface of the body member 47a may also be joined by welding to the front surface of the front pillar 45. Due to the arrangement of the members as described above, the front side members 2, the dash cross-member 4, the pillar braces 6 and the reinforcement members 47 are disposed at the same height position. Each reinforcement member 47 heightens the strengths of the front surface and the inner side surface of the front pillar 45 and the strength of the front pillar 45 in the diagonal direction from a front end outer side to a rear end inner side, and also heightens the strength of the corner portion connecting the front surface and the inner side surface of the front pillar 45, and also heightens the coupling strength between the pillar brace 6 and the front pillar 45.

In the case of a head-on collision and an angled forward collision, the front structure 41 having the reinforcement members 47 as described above operates substantially in the same manner as the front structure 1 as described in conjunction with the first embodiment.

This front structure 41 achieves substantially the same effects as the front structure 1. In particular, since the reinforcement members 47 have a generally triangular shape in a sectional view, the strength of the front pillars 45 in diagonal directions is high. Thus, the front structure 41 is suitable for collision loads input obliquely from front.

Figure 12:
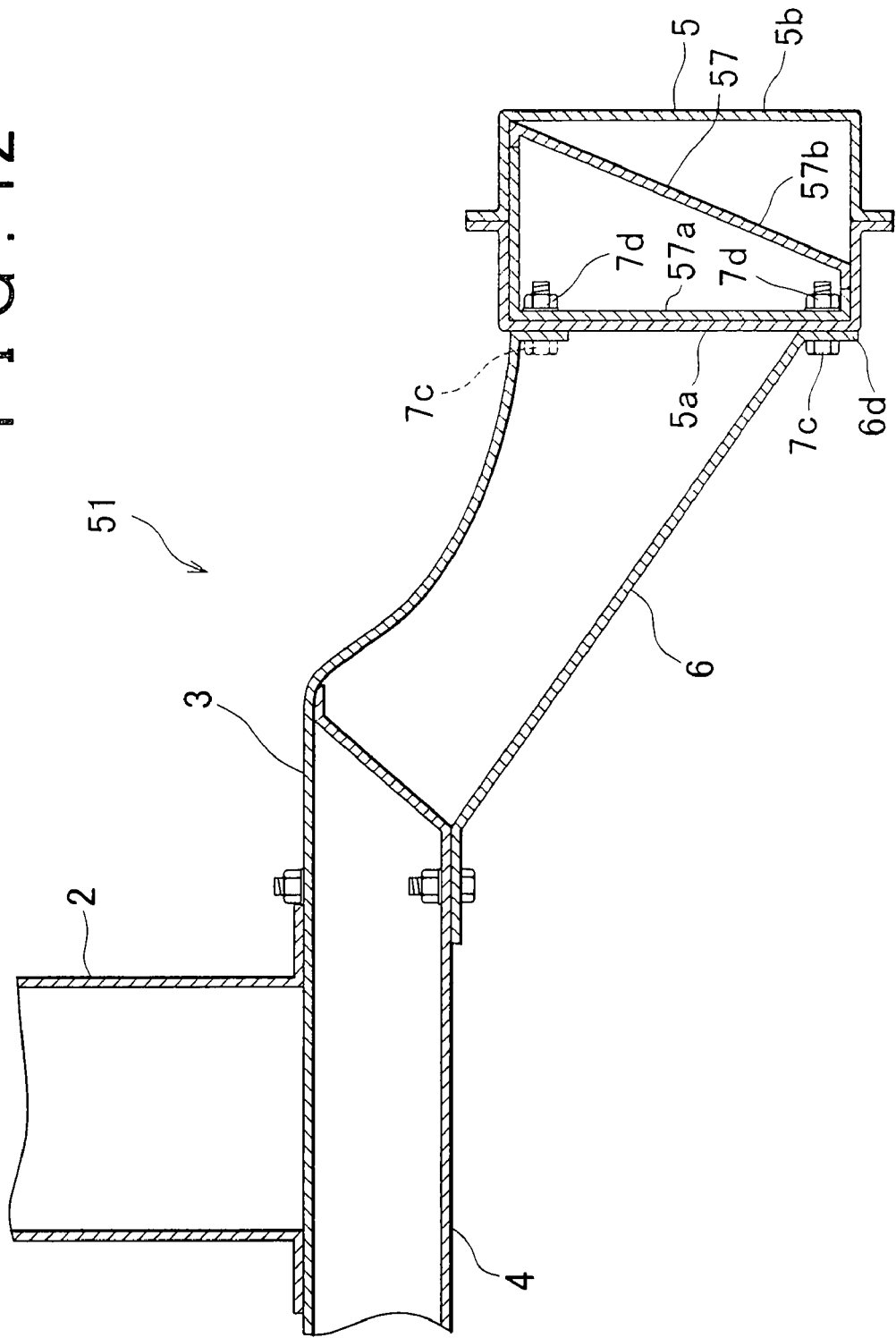
FIG. 12 is a plan sectional view of a right-rearward portion and its surroundings in a front structure in accordance with a sixth embodiment of the invention.
Figure 13:
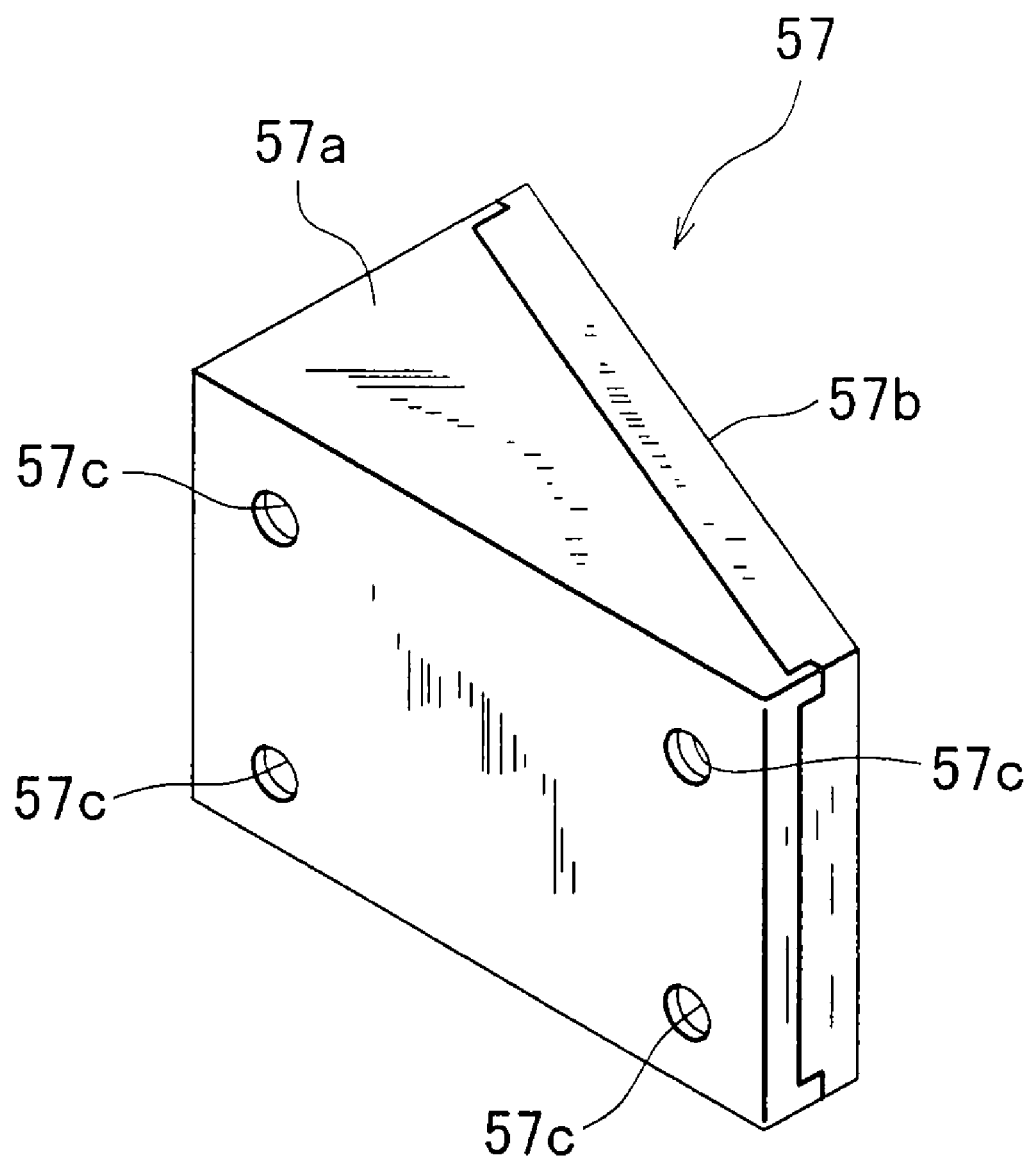
FIG. 13 is a perspective view of a reinforcement member in the front structure in accordance with the sixth embodiment of the invention.

A front structure 51 in accordance with a sixth embodiment will be described with reference to FIGS. 12 and 13. FIG. 12 is a plan sectional view of a right-rearward portion and its surroundings in a front structure in accordance with the sixth embodiment. FIG. 13 is a perspective view of a reinforcement member of the front structure in accordance with the sixth embodiment. Incidentally, with regard to the front structure 51, constructions substantially the same as those of the front structure 1 in accordance with the first embodiment are suffixed with the same reference characters, and the description thereof will be omitted.

The front structure 51 has substantially the same collision absorption structure as the front structure 1, but is different from the front structure 1 in the shape of reinforcement members 57.

As shown in FIG. 12, the reinforcement members 57 are provided for heightening the strength of the front pillars 5, and are disposed within the front pillars 5. Each reinforcement member 57 is made up of two members: a body member 57a and a lid member 57b. The body member 57a is a plate member whose section in the horizontal direction is a square-C shape in which a front side and a rear side are different in length, and is joined to the cabin-side surface and the front surface of the front pillar 5 (a pillar inner member 5a). As for each reinforcement member 57, the length of the inner-side surface of the body member 57a in the vehicle longitudinal direction is set so as to fully fill the interior space of the front pillar 5 in the vehicle longitudinal direction. The length of the front surface of the body member 57a in the vehicle width direction is set so as to substantially fully fill the interior space of the front pillar 5 in the width direction. The length of the rear surface of the body member 57a in the width direction is a predetermined length (that is slightly longer than the length of the flange portion of the lid member 57b) which is shorter than the length of the front surface of the body member 57a in the width direction. An upper end and a lower end of the body member 57a are provided with trapezoidal upper and lower surfaces, respectively, whose sides are along the ends of the front surface, the rear surface and the inner side surface of the body member 57a. Four corner portions of the cabin-side surface of the body member 57a have bolt holes 57b at positions that correspond one-to-one to the bolt holes formed in the flange 6d of the pillar brace 6. The lid member 57b has a lid-like shape that covers an opening portion of the body member 57a. The lid member 57b is placed so as to cover the opening portion of the body member 57a, and the flange portion of the lid member 57b is joined by welding thereto. Therefore, the shape of the reinforcement members 57 in a section taken in the horizontal direction is a trapezoidal shape whose upper base is very short (i.e., a generally triangular shape). In other words, the shape of the reinforcement members 57 in a section taken in the horizontal direction is a trapezoidal shape in which the length of the rearward side of the two parallel sides is shorter than the length of the forward side (i.e., a generally triangular shape).

On each of the left and right sides of the front structure 51, the reinforcement member 57 is disposed within the front pillar 5 at the same position in the up-down direction as the pillar brace 6. The bolt holes 57c are aligned with the corresponding bolt holes of the flange 6d of the pillar brace 6, with a pillar inner member 5a sandwiched between the reinforcement member 57 and the pillar brace 6. Then, the reinforcement member 57 and the pillar brace 6 are joined at the four sites by bolting with bolts 7c and nuts 7d, with the pillar inner member 5a sandwiched therebetween. Furthermore, the front surface and the rear surface of the body member 57a may also be joined by welding to the front surface and the rear surface of the front pillar 5. Due to the arrangement of the members as described above, the front side members 2, the dash cross-member 4, the pillar braces 6 and the reinforcement members 57 are disposed at the same height position. Each reinforcement member 57 heightens the strengths of the front surface and the inner side surface of the front pillar 5 and the strength of the front pillar 5 in the diagonal direction from a front end outer side to a rear end inner side, and also heightens the strength of the corner portion connecting the front surface and the inner side surface of the front pillar 5, and also heightens the coupling strength between the pillar brace 6 and the front pillar 5.

In the case of a head-on collision and an angled forward collision, the front structure 51 having the reinforcement members 57 as described above operates substantially in the same manner as the front structure 1 as described in conjunction with the first embodiment.

This front structure 51 achieves substantially the same effects as the front structure 1. In particular, since the reinforcement members 57 have a trapezoidal shape (a generally triangular shape) in a sectional view, the strength of the front pillars 5 in diagonal directions is high. Thus, the front structure 51 is suitable for collision loads input obliquely from front.

Figure 14:
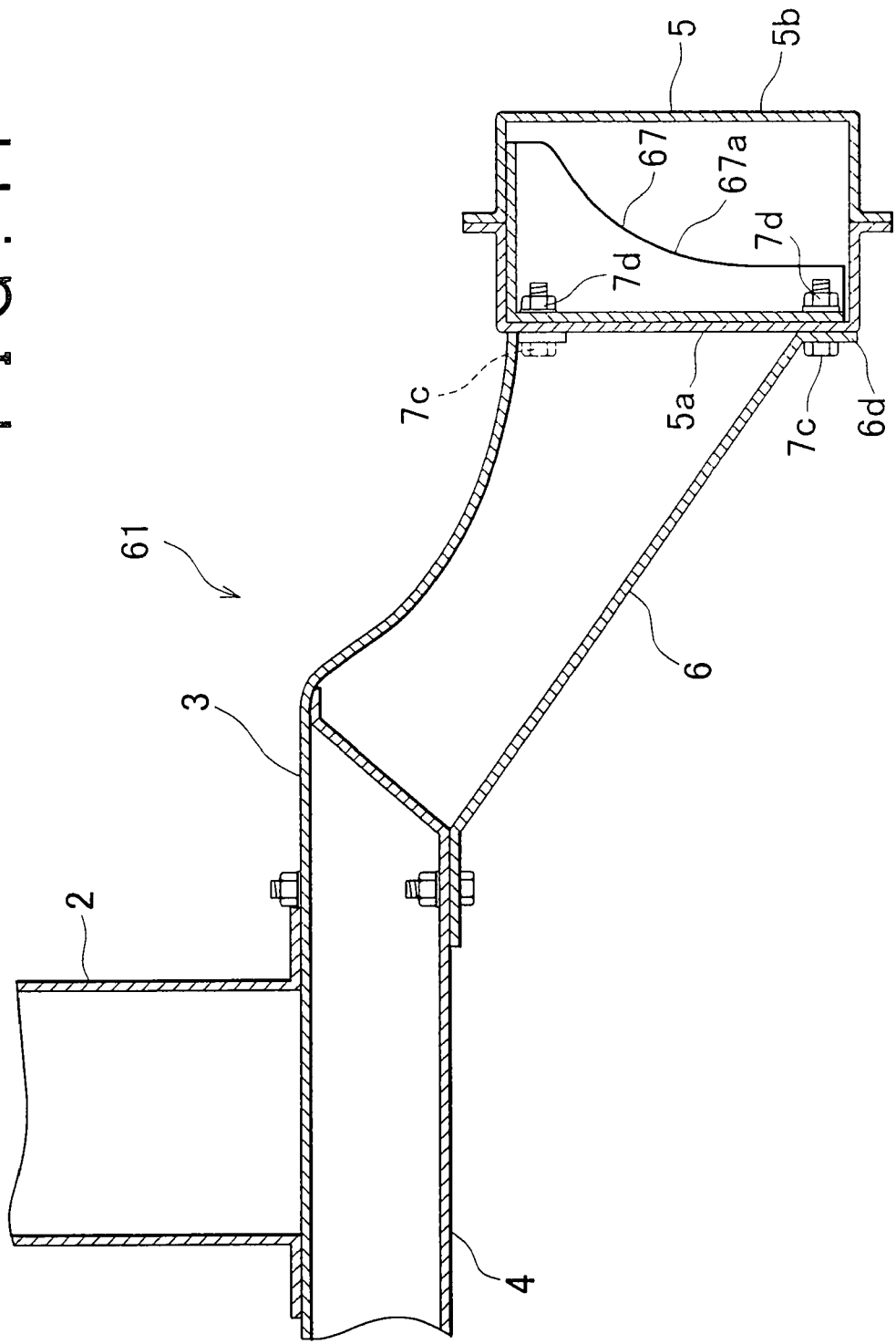
FIG. 14 is a plan sectional view of a right-rearward portion and its surroundings in a front structure in accordance with a seventh embodiment of the invention.
Figure 15:
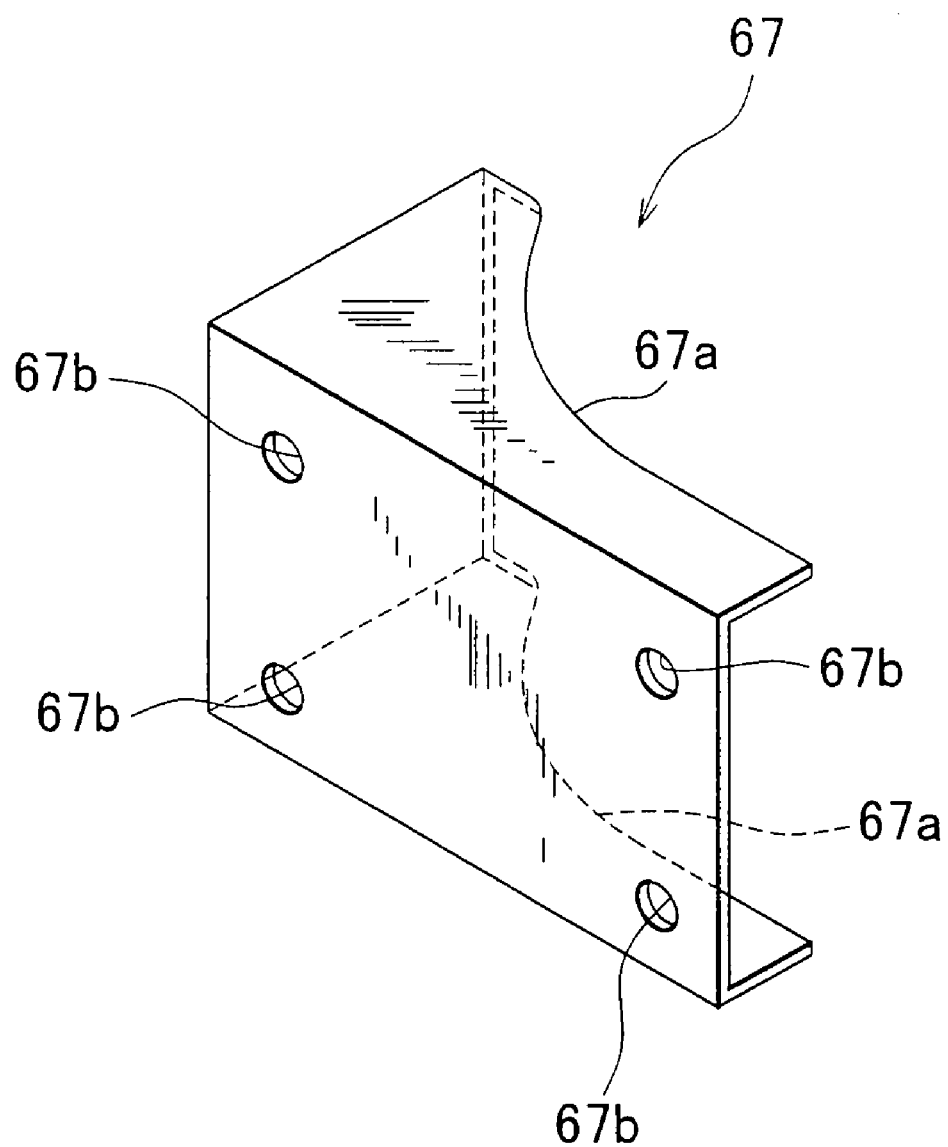
FIG. 15 is a perspective view of a reinforcement member in the front structure in accordance with the seventh embodiment of the invention.

A front structure 61 in accordance with a seventh embodiment will be described with reference to FIGS. 14 and 15. FIG. 14 is a plan sectional view of a right-rearward portion and its surroundings in a front structure in accordance with the seventh embodiment. FIG. 15 is a perspective view of a reinforcement member of the front structure in accordance with the seventh embodiment. Incidentally, with regard to the front structure 61, constructions substantially the same as those of the front structure 1 in accordance with the first embodiment are suffixed with the same reference characters, and the description thereof will be omitted.

The front structure 61 has substantially the same collision absorption structure as the front structure 1, but is different from the front structure 1 in the shape of reinforcement members 67.

As shown in FIG. 14, the reinforcement members 67 are provided for heightening the strength of the front pillars 5, and are disposed within the front pillars 5. As shown in FIG. 15, the shape of each reinforcement member 67 in a section taken in the horizontal direction is an L-shape, and an upper end portion and a lower end portion of each reinforcement member 67 are provided with flanges 67a extending inward with respect to the L-shape reinforcement member 67. Each flange 67a is formed wide so as to extend from a front end outer side to a rear end cabin side in a diagonal direction, and has a generally triangular shape. The length of the cabin-side surface of each reinforcement member 67 in the vehicle longitudinal direction is set so as to fully fill the interior space of the front pillar 5 in the vehicle longitudinal direction. The length of the front surface of each reinforcement member 67 in the vehicle width direction is set so as to substantially fully fill the interior space of the front pillar 5 in the width direction. Four corner portions of the inner side surface of the reinforcement member 67 have bolt holes 67b at positions that correspond one-to-one to the bolt holes formed in the flange 6d of the pillar brace 6.

On each of the left and right sides of the front structure 61, as shown in FIG. 14, the reinforcement member 67 is disposed within the front pillar 5 at the same position in the up-down direction as the pillar brace 6. The bolt holes 67b are aligned with the corresponding bolt holes of the flange 6d of the pillar brace 6, with a pillar inner member 5a sandwiched between the reinforcement member 67 and the pillar brace 6. Then, the reinforcement member 67 and the pillar brace 6 are joined at the four sites by bolting with bolts 7c and nuts 7d, with the pillar inner member 5a sandwiched therebetween. Furthermore, the front surface of the reinforcement member 67 may also be joined by welding to the front surface of the front pillar 5. Due to the arrangement of the members as described above, the front side members 2, the dash cross-member 4, the pillar braces 6 and the reinforcement members 67 are disposed at the same height position. Each reinforcement member 67 heightens the strengths of the front surface and the inner side surface of the front pillar 5 and the strength of the front pillar 5 in the diagonal direction from a front end outer side to a rear end inner side, and also heightens the strength of the corner portion connecting the front surface and the inner side surface of the front pillar 5, and also heightens the coupling strength between the pillar brace 6 and the front pillar 5. This improves the strength of each front pillar 5 itself, and improves the efficiency of the transmission of collision impact between the front pillar 5 and the pillar brace 6.

In the case of a head-on collision and an angled forward collision, the front structure 61 having the reinforcement members 67 as described above operates substantially in the same manner as the front structure 1 as described in conjunction with the first embodiment.

This front structure 61 achieves substantially the same effects as the front structure 1. In particular, since the reinforcement members 67 have generally triangular flanges 67a, the strength of the front pillars 5 in diagonal directions is high. Thus, the front structure 61 is suitable for collision loads input obliquely from front.

While embodiments of the invention have been described above, the invention is not limited to the foregoing embodiments, but can also be embodied in various other manners.

For example, although in the foregoing embodiments, the invention is applied to common normal-size vehicles, the invention is also applicable to various vehicle types, including small-size car, sports cars, trucks, etc.

In the foregoing embodiments, the reinforcement members are provided for heightening the strength of the front pillars, other means for heightening the strength may be provided. For example, possible constructions include a construction in which a portion whose strength is desired to be heightened is provided with a reinforcement plate, a construction in which a portion whose strength is desired to be heightened is provided with an increased plate thickness, a construction in which a portion whose strength is desired to be heightened is made of a material whose strength is high, etc.

Although in the foregoing embodiments, the reinforcement members are provided within the front pillars, reinforcement members may be provided on exterior surfaces of the front pillars. In this case, the pillar braces and the front pillars are coupled with the reinforcement members sandwiched therebetween.

Although in the foregoing embodiments, the coupling between the reinforcement members and the pillar brace, and the coupling between the dash cross-member (the dash panel) and the pillar braces are accomplished by bolting, the coupling method may employ other means, for example, welding.

Furthermore, although in the foregoing embodiments, the pillar braces are coupled by bolting to the dash cross-member and the dash panel, it is also permissible to adopt a construction in which the pillar braces are coupled to one of the dash cross-member and the dash panel. It is also permissible to adopt a construction in which the pillar braces are coupled by bolting to wheelhouse portions of the dash panel. Such a construction further improves the efficiency of the transmission of collision load via the pillar braces.

Furthermore, although in the foregoing embodiments, the pillar braces and the reinforcement members are disposed at the height position of the front side members, the pillar braces and the reinforcement members may also be disposed at another height position since there are cases where collision load is not input to the front side members. For example, it is permissible to adopt a construction in which the pillar braces and the reinforcement members are disposed at the height position of a cowl provided above the dash panel. Besides, the coupling position of a front portion of each pillar brace in the width direction may also be changed. For example, the front portion of each pillar brace may be disposed at a position that overlaps with the positions of the front side members in the width direction. The disposing of the pillar braces and the reinforcement members at the foregoing positions will further improve the efficiency of the transmission of collision load via the pillar braces.

The invention claimed is:

1. A vehicle front structure, comprising:
a structural member that is disposed forward of a cabin of a vehicle and that extends in a vehicle width direction;
a front pillar that is provided at each of two opposite ends of the structural member in the vehicle width direction and that extends in a height direction of the vehicle;
a pillar brace which has a first end portion that is provided at a cabin side and that is coupled to the structural member, and which has a second end portion that is provided at an outer side of the first end portion in the vehicle width direction and that is coupled to a cabin-side surface of the front pillar, and
a reinforcement member that raises at least a strength of the cabin-side surface and a front surface of the front pillar, the reinforcement member being provided at a height at which the front pillar and the pillar brace are connected to each other,
wherein the structural member includes:
a dash panel that extends in the vehicle width direction and that is disposed forward of the cabin;
a front side member that is joined to a front surface of the dash panel and that extends toward a front of the vehicle; and
a dash cross-member that is provided at such a position as to overlap with a height at which the front side member is coupled, and that is coupled to a rear surface of the dash panel and that extends in the vehicle width direction,
wherein the reinforcement member is provided within the front pillar at such a position as to overlap with the height at which the front pillar and the pillar brace are coupled to each other, and has a cabin-side surface portion facing a cabin-side surface of an interior of the front pillar, and a front surface portion facing a front-side surface of the interior of the front pillar, and
wherein the cabin-side surface portion and the front surface portion of the reinforcement member are provided with generally triangular flange portions that are protruded inward from an upper end portion and a lower end portion, respectively, of each of the cabin-side surface portion and the front surface portion, and that extend from an outer-side portion of a front end of the reinforcement member in the vehicle width direction to a cabin-side portion of a rear end of the reinforcement member.

2. The vehicle front structure according to claim 1, wherein the reinforcement member has a rear surface portion facing a rear interior surface of the front pillar.

3. The vehicle front structure according to claim 1, wherein the reinforcement member is coupled to the pillar brace, with the cabin-side surface of the front pillar sandwiched between the reinforcement member and the pillar brace.

4. The vehicle front structure according to claim 1, wherein the front pillar is made up of a pillar outer member provided at an outer side in the vehicle width direction, and a pillar inner member provided on the cabin-side of the pillar outer member, and the second end portion of the pillar brace is coupled to the pillar inner member.

5. The vehicle front structure according to claim 1, wherein the structural member is a dash panel, and the first end portion of the pillar brace is coupled to the dash panel.

6. The vehicle front structure according to claim 1, wherein the structural member is a dash cross-member, and the first end portion of the pillar brace is coupled to the dash cross-member.

7. The vehicle front structure according to claim 1, wherein the pillar brace is disposed at such a position as to overlap with a front side member in the height direction of the vehicle.

8. The vehicle front structure according to claim 1, wherein the pillar brace is disposed at such a position as to overlap with a front side member in the vehicle width direction.

9. The vehicle front structure according to claim 1, wherein:
the reinforcement member includes a rear surface portion that faces a rear-side surface of the interior of the front pillar in a vehicle longitudinal direction;
a section of the reinforcement member taken in a horizontal direction is a substantially square-C shape;
an upper end portion and a lower end portion of the reinforcement member are each provided with a flange portion extending inward with respect to the substantially square-C shape;
a length of the cabin-side surface portion of the reinforcement member in the vehicle longitudinal direction is substantially equal to a length of the cabin-side surface of the interior of the front pillar in the vehicle longitudinal direction;
lengths of the front surface portion and the rear surface portion of the reinforcement member in the vehicle width direction are substantially equal to lengths of the front-side surface and the rear-side surface, respectively, of the interior of the front pillar in the vehicle width direction; and
a length of the reinforcement member in a vehicle up-down direction is longer than a length of the pillar brace in the vehicle up-down direction by a predetermined length.

10. A vehicle front structure, comprising:
a structural member that is disposed forward of a cabin of a vehicle and that extends in a vehicle width direction;
a front pillar that is provided at each of two opposite ends of the structural member in the vehicle width direction and that extends in a height direction of the vehicle;
a pillar brace which has a first end portion that is provided at a cabin side and that is coupled to the structural member, and which has a second end portion that is provided at an outer side of the first end portion in the vehicle width direction and that is coupled to a cabin-side surface of the front pillar, and
a reinforcement member that raises at least a strength of the cabin-side surface and a front surface of the front pillar, the reinforcement member being provided at a height at which the front pillar and the pillar brace are connected to each other,
wherein the structural member includes:
a dash panel that extends in the vehicle width direction and that is disposed forward of the cabin;
a front side member that is joined to a front surface of the dash panel and that extends toward a front of the vehicle; and
a dash cross-member that is provided at such a position as to overlap with a height at which the front side member is coupled, and that is coupled to a rear surface of the dash panel and that extends in the vehicle width direction,
wherein the reinforcement member is provided within the front pillar at such a position as to overlap with the height at which the front pillar and the pillar brace are coupled to each other, and has a cabin-side surface portion facing a cabin-side surface of an interior of the front pillar, and a front surface portion facing a front-side surface of the interior of the front pillar,
and wherein:
the reinforcement member includes a curved portion that extends from an outer-side portion of a front surface side of the front pillar in the vehicle width direction to a cabin-side portion of the rear surface side, and is curved so as to expand rearward with respect to the vehicle;
the cabin-side surface portion is a substantially square-C shape flange portion that is formed on a cabin-side end portion of the curved portion and that extends along the cabin-side surface of the interior of the front pillar;
the front surface portion is a substantially square-C shape flange portion that is formed on a front end portion of the curved portion and that extends along the front-side surface of the interior of the front pillar;
a length of the cabin-side surface portion in a vehicle longitudinal direction is substantially equal to a length of the cabin-side surface of the interior of the front pillar in the vehicle longitudinal direction;
a length of the front surface portion in the vehicle width direction is substantially equal to a length of the front-side surface of the interior of the front pillar in the vehicle width direction; and
a length of the reinforcement member in a vehicle up-down direction is longer than a length of the pillar brace in the vehicle up-down direction by a predetermined length.

11. A vehicle front structure, comprising:
a structural member that is disposed forward of a cabin of a vehicle and that extends in a vehicle width direction;
a front pillar that is provided at each of two opposite ends of the structural member in the vehicle width direction and that extends in a height direction of the vehicle;
a pillar brace which has a first end portion that is provided at a cabin side and that is coupled to the structural member, and which has a second end portion that is provided at an outer side of the first end portion in the vehicle width direction and that is coupled to a cabin-side surface of the front pillar, and
a reinforcement member that raises at least a strength of the cabin-side surface and a front surface of the front pillar, the reinforcement member being provided at a height at which the front pillar and the pillar brace are connected to each other,
wherein the structural member includes:
a dash panel that extends in the vehicle width direction and that is disposed forward of the cabin;
a front side member that is joined to a front surface of the dash panel and that extends toward a front of the vehicle; and a dash cross-member that is provided at such a position as to overlap with a height at which the front side member is coupled, and that is coupled to a rear surface of the dash panel and that extends in the vehicle width direction, wherein the reinforcement member is provided within the front pillar at such a position as to overlap with the height at which the front pillar and the pillar brace are coupled to each other, and has a cabin-side surface portion facing a cabin-side surface of an interior of the front pillar, and a front surface portion facing a front-side surface of the interior of the front pillar, and wherein:

the reinforcement member includes a substantially rectangular first plate member having a size that fits to a section of the front pillar taken in the horizontal direction, and a generally rectangular second plate member provided below the first plate member and having a size that fits to the section of the front pillar taken in the horizontal direction;

the first plate member includes a flange portion that is protruded upward from each of four side end portions of the substantially rectangular shape and that extends along an interior surface of the front pillar; and the second plate member includes a flange portion that is protruded downward from each of four side end portions of the generally rectangular shape and that extends along the interior surface of the front pillar.

12. A vehicle front structure, comprising:

a structural member that is disposed forward of a cabin of a vehicle and that extends in a vehicle width direction;

a front pillar that is provided at each of two opposite ends of the structural member in the vehicle width direction and that extends in a height direction of the vehicle;

a pillar brace which has a first end portion that is provided at a cabin side and that is coupled to the structural member, and which has a second end portion that is provided at an outer side of the first end portion in the vehicle width direction and that is coupled to a cabin-side surface of the front pillar, and a reinforcement member that raises at least a strength of the cabin-side surface and a front surface of the front pillar, the reinforcement member being provided at a height at which the front pillar and the pillar brace are connected to each other, wherein the structural member includes:

a dash panel that extends in the vehicle width direction and that is disposed forward of the cabin;

a front side member that is joined to a front surface of the dash panel and that extends toward a front of the vehicle; and a dash cross-member that is provided at such a position as to overlap with a height at which the front side member is coupled, and that is coupled to a rear surface of the dash panel and that extends in the vehicle width direction, wherein the reinforcement member is provided within the front pillar at such a position as to overlap with the height at which the front pillar and the pillar brace are coupled to each other, and has a cabin-side surface portion facing a cabin-side surface of an interior of the front pillar, and a front surface portion facing a front-side surface of the interior of the front pillar, and wherein:

the front pillar is made up of a pillar outer member provided at an outer side in the vehicle width direction, and a pillar inner member provided at the cabin side of the pillar outer member;

a front surface and a rear surface of each of the pillar outer member and the pillar inner member are provided with a first flange portion protruded forward with respect to the vehicle and a second flange portion protruded rearward with respect to the vehicle, respectively;

the reinforcement member includes a rear surface portion that faces a rear-side surface of the interior of the front pillar in a vehicle longitudinal direction;

a section of the reinforcement member taken in a horizontal direction is a generally square-C shape;

a length of the cabin-side surface portion of the reinforcement member in the vehicle longitudinal direction is substantially equal to a length of the cabin-side surface of the interior of the pillar inner member in the vehicle longitudinal direction;

lengths of the front surface portion and the rear surface portion of the reinforcement member in the vehicle width direction are substantially equal to lengths of the front-side surface and the rear-side surface, respectively, of the interior of the pillar inner member in the vehicle width direction;

a length of the reinforcement member in a vehicle up-down direction is longer than a length of the pillar brace in the vehicle up-down direction by a predetermined length;

outer-side end portions of the front surface portion and the rear surface portion in the vehicle width direction are provided with a third flange portion protruded forward with respect to the vehicle and a fourth flange portion protruded rearward with respect to the vehicle, respectively; and the front pillar is formed by joining the first to fourth flange portions, with the reinforcement member sandwiched between the pillar inner member and the pillar outer member.

13. A vehicle front structure, comprising:

a structural member that is disposed forward of a cabin of a vehicle and that extends in a vehicle width direction;

a front pillar that is provided at each of two opposite ends of the structural member in the vehicle width direction and that extends in a height direction of the vehicle;

a pillar brace which has a first end portion that is provided at a cabin side and that is coupled to the structural member, and which has a second end portion that is provided at an outer side of the first end portion in the vehicle width direction and that is coupled to a cabin-side surface of the front pillar, and a reinforcement member that raises at least a strength of the cabin-side surface and a front surface of the front pillar, the reinforcement member being provided at a height at which the front pillar and the pillar brace are connected to each other, wherein the structural member includes:

a dash panel that extends in the vehicle width direction and that is disposed forward of the cabin;

a front side member that is joined to a front surface of the dash panel and that extends toward a front of the vehicle; and a dash cross-member that is provided at such a position as to overlap with a height at which the front side member is coupled, and that is coupled to a rear surface of the dash panel and that extends in the vehicle width direction, wherein the reinforcement member is provided within the front pillar at such a position as to overlap with the height at which the front pillar and the pillar brace are coupled to each other, and has a cabin-side surface portion facing a cabin-side surface of an interior of the front pillar, and a front surface portion facing a front-side surface of the interior of the front pillar, and wherein:
the reinforcement member includes a plate diagonal member that extends between an outer-side end portion of the front surface portion in the vehicle width direction and a rear-side end portion of the cabin-side surface portion;
an upper end portion and a lower end portion of each of the front surface portion and the cabin-side surface portion are each provided with a flange portion extending inward with respect to the reinforcement member;
a length of the cabin-side surface portion of the reinforcement member in a vehicle longitudinal direction is substantially equal to a length of the cabin-side surface of the interior of the front pillar in the vehicle longitudinal direction;
a length of the front surface portion of the reinforcement member in the vehicle width direction is substantially equal to a length of the front-side surface of the interior of the front pillar in the vehicle width direction;
a length of the reinforcement member in a vehicle up-down direction is longer than a length of the pillar brace in the vehicle up-down direction by a predetermined length; and
a length of the front pillar in the vehicle longitudinal direction is longer than a length of the pillar brace in the vehicle longitudinal direction.

14. A vehicle front structure, comprising:
a structural member that is disposed forward of a cabin of a vehicle and that extends in a vehicle width direction;
a front pillar that is provided at each of two opposite ends of the structural member in the vehicle width direction and that extends in a height direction of the vehicle;
a pillar brace which has a first end portion that is provided at a cabin side and that is coupled to the structural member, and which has a second end portion that is provided at an outer side of the first end portion in the vehicle width direction and that is coupled to a cabin-side surface of the front pillar, and
a reinforcement member that raises at least a strength of the cabin-side surface and a front surface of the front pillar, the reinforcement member being provided at a height at which the front pillar and the pillar brace are connected to each other,
wherein the structural member includes:
a dash panel that extends in the vehicle width direction and that is disposed forward of the cabin;
a front side member that is joined to a front surface of the dash panel and that extends toward a front of the vehicle; and
a dash cross-member that is provided at such a position as to overlap with a height at which the front side member is coupled, and that is coupled to a rear surface of the dash panel and that extends in the vehicle width direction,
wherein the reinforcement member is provided within the front pillar at such a position as to overlap with the height at which the front pillar and the pillar brace are coupled to each other, and has a cabin-side surface portion facing a cabin-side surface of an interior of the front pillar, and a front surface portion facing a front-side surface of the interior of the front pillar, and wherein:
the reinforcement member is made up of a body member and a lid member;
the body member includes the front surface portion and the cabin-side surface portion, and is provided with a rear surface portion that is provided at a rear-side end portion of the cabin-side surface portion in a vehicle longitudinal direction, and that has a length that is shorter than a length of the front surface portion in the vehicle width direction, and that faces a rear-side surface of the front pillar in the vehicle longitudinal direction, and an upper end and a lower end of the body member are provided with an upper surface portion and a lower surface portion, respectively, each of which has a trapezoidal shape whose sides include end portions of the front surface portion, the rear surface portion and the cabin-side surface portion of the body member; and
the lid member is a lid-shape member joined to the body member and covering an opening portion of the body member.

15. The vehicle front structure as claimed in claim 1, wherein the front pillar is made up of a pillar outer member provided at an outer side of the vehicle width direction, and a pillar inner member provided at the cabin side of the pillar outer member; and the reinforcement member is fixed to the pillar brace via the pillar inner member by a bolt.

16. The vehicle front structure as claimed in claim 1, wherein the front pillar is made up of a pillar outer member provided at an outer side of the vehicle width direction, and a pillar inner member provided at the cabin side of the pillar outer member; and the reinforcement member is laminated to the pillar inner member at a portion where the pillar brace is connected to the front pillar.

17. The vehicle front structure as claimed in claim 1, wherein the front pillar is made up of a pillar outer member provided at an outer side of the vehicle width direction, and a pillar inner member provided at the cabin side of the pillar outer member; and the reinforcement member has a U-shaped cross-section, a closed end of which faces the pillar inner member.

18. The vehicle front structure as claimed in claim 1, wherein the front pillar is made up of a pillar outer member provided at an outer side of the vehicle width direction, and a pillar inner member provided at the cabin side of the pillar outer member; and the reinforcement member is connected to an inner side surface of the pillar inner member at a position where the pillar brace is connected to the pillar inner member.

19. The vehicle front structure as claimed in claim 1, wherein the pillar brace is formed by a single plate member, in which one end of the single plate member is connected to the front pillar and the other end of the single plate member is connected to the dash panel.

20. The vehicle front structure as claimed in claim 1, wherein the reinforcement member heightens a strength of the front pillar only at a portion corresponding to the pillar brace in the height direction of the vehicle.

21. A vehicle front structure, comprising:
a structural member that is disposed forward of a cabin of a vehicle and that extends in a vehicle width direction;
a front pillar that is provided at each of two opposite ends of the structural member in the vehicle width direction and that extends in a height direction of the vehicle;

a pillar brace which has a first end portion that is provided at a cabin side and that is coupled to the structural member, and which has a second end portion that is provided at an outer side of the first end portion in the vehicle width direction and that is coupled to a cabin-side surface of the front pillar, and a reinforcement member that raises at least a strength of the cabin-side surface of the front pillar, the reinforcement element being provided at a height at which the front pillar and the pillar brace are connected to each other, wherein the structural member includes:

a dash panel that extends in the vehicle width direction and that is disposed forward of the cabin;

a front side member that is joined to a front surface of the dash panel and that extends toward a front of the vehicle; and a dash cross-member that is provided at such a position as to overlap with a height at which the front side member is coupled, and that is coupled to a rear surface of the dash panel and that extends in the vehicle width direction, wherein the reinforcement member is provided within the front pillar at such a position as to overlap with the height at which the front pillar and the pillar brace are coupled to each other, and has a cabin-side surface portion facing a cabin-side surface of an interior of the front pillar, and a front surface portion facing a front-side surface of the interior of the front pillar, wherein the cabin-side surface portion and the front surface portion of the reinforcement member are provided with generally triangular flange portions that are protruded inward from an upper end portion and a lower end portion, respectively, of each of the cabin-side surface portion and the front surface portion, and that extend from an outer-side portion of a front end of the reinforcement member in the vehicle width direction to a cabin-side portion of a rear end of the reinforcement member.

* * * * *

UNITED STATES PATENT AND TRADEMARK OFFICE
CERTIFICATE OF CORRECTION

PATENT NO.         : 8,029,050 B2                                        Page 1 of 1
APPLICATION NO.    : 12/447048
DATED              : October 4, 2011
INVENTOR(S)        : Koji Tamakoshi It is certified that error appears in the above-identified patent and that said Letters Patent is hereby corrected as shown below:

| Column | Line |   |
|--------|------|---|
| 6      | 66   | Change "lip-down" to --up-down--. |

Signed and Sealed this
Tenth Day of April, 2012

David J. Kappos
*Director of the United States Patent and Trademark Office*